US012632943B2

(12) United States Patent
  Balashov

(10) Patent No.: US 12,632,943 B2
(45) Date of Patent: May 19, 2026

(54) CORRECTION OF ABERRATIONS IN IN-LINE ELECTRON HOLOGRAPHY

(71) Applicant: FEI Company, Hillsboro, OR (US)

(72) Inventor: Konstantin Balashov, Hillsboro, OR (US)

(73) Assignee: FEI COMPANY, Hillsboro, OR (US)

( * ) Notice: Subject to any disclaimer, the term of this patent is extended or adjusted under 35 U.S.C. 154(b) by 51 days.

(21) Appl. No.: 18/677,303

(22) Filed: May 29, 2024

(65) Prior Publication Data

US 2025/0371687 A1    Dec. 4, 2025

(51) Int. Cl.
  *G06T 5/80*      (2024.01)
  *G03H 5/00*      (2006.01)

(52) U.S. Cl.
  CPC ................. *G06T 5/80* (2024.01); *G03H 5/00* (2013.01); *G03H 2224/04* (2013.01)

(58) Field of Classification Search
  None
  See application file for complete search history.

(56) References Cited

U.S. PATENT DOCUMENTS

2008/0265130 A1* 10/2008 Colomb ................... G03H 1/08
                                                                250/201.9
2023/0360207 A1* 11/2023 Singh ................... G06V 10/764

OTHER PUBLICATIONS

Latychevskaia, et al. "Practical algorithms for simulation and reconstruction of digital in-line holograms" http://arxiv.org/abs/1412.3674v8 [physics.optic] Jun. 28, 2023, 16 pages.
Latychevskaia, et al. "Reconstruction of purely absorbing, absorbing and phase-shifting, and strong phase-shifting objects from their single-shot in-line holograms" Applied Optics, vol. 54, Issue 13, pp. 3925-3932 (2015).

* cited by examiner

*Primary Examiner* — Xiaolan Xu
(74) *Attorney, Agent, or Firm* — Amin, Turocy & Watson, LLP

(57) ABSTRACT

Embodiments herein relate to a process for electron holography image aberration reduction. A system can comprise a memory that stores, and a processor that executes, computer executable components. The computer executable components can comprise a propagating component that reduces hologram aberration of an electron hologram (EH) image by modifying of a pair of sequenced parameters of an array upon which the EH image is constructed, resulting in a modified array, and a generating component that generates a propagated EH image using a propagator comprising the modified array.

20 Claims, 15 Drawing Sheets

SCIENTIFIC INSTRUMENT MODULE 100

FIRST (PARAMETER DETERMINATION) LOGIC 102

SECOND (PROPAGATOR GENERATING) LOGIC 104

THIRD (SIGNAL ACQUISITION) LOGIC 106

FOURTH (PROPAGATED HOLOGRAM GENERATION) LOGIC 108

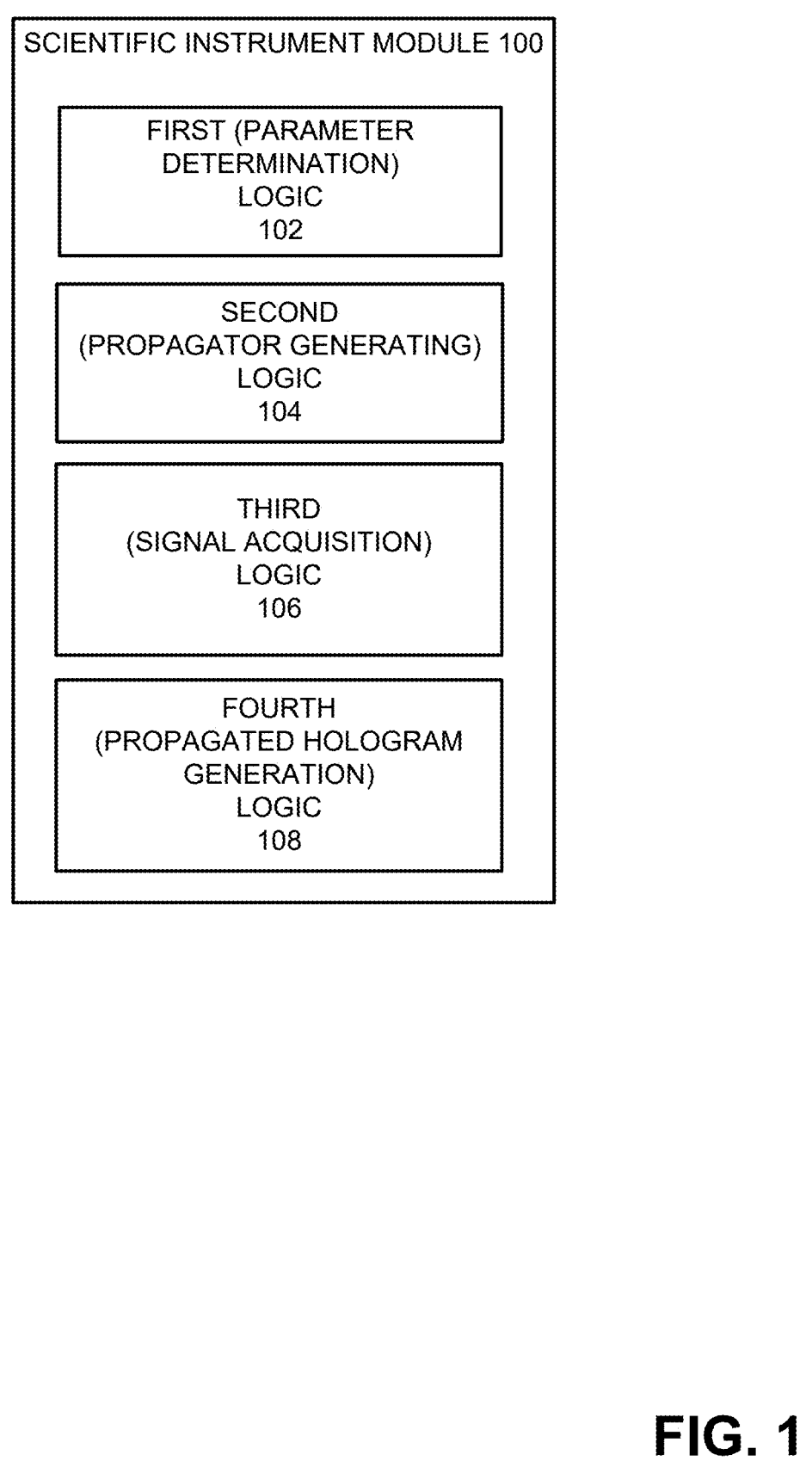

SCIENTIFIC INSTRUMENT MODULE 100

FIRST (PARAMETER DETERMINATION) LOGIC 102

SECOND (PROPAGATOR GENERATING) LOGIC 104

THIRD (SIGNAL ACQUISITION) LOGIC 106

FOURTH (PROPAGATED HOLOGRAM GENERATION) LOGIC 108

FIG. 1

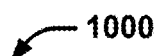

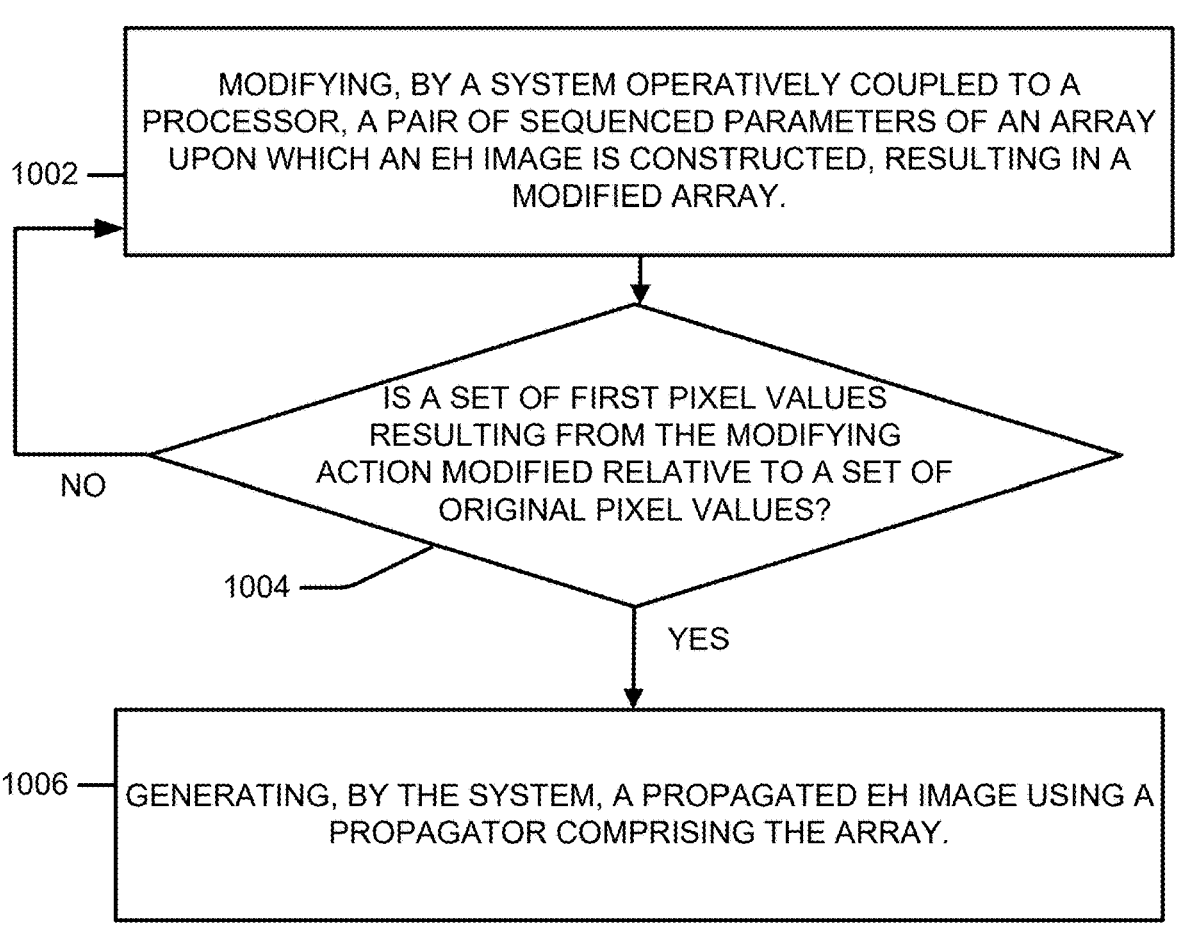

1002 — MODIFYING, BY A SYSTEM OPERATIVELY COUPLED TO A PROCESSOR, A PAIR OF SEQUENCED PARAMETERS OF AN ARRAY UPON WHICH AN EH IMAGE IS CONSTRUCTED, RESULTING IN A MODIFIED ARRAY.

IS A SET OF FIRST PIXEL VALUES RESULTING FROM THE MODIFYING ACTION MODIFIED RELATIVE TO A SET OF ORIGINAL PIXEL VALUES?

NO

1004 —

YES

1006 — GENERATING, BY THE SYSTEM, A PROPAGATED EH IMAGE USING A PROPAGATOR COMPRISING THE ARRAY.

FIG. 10

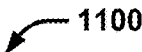

1100

1102 — DETERMINING, BY A SYSTEM OPERATIVELY COUPLED TO A PROCESSOR, AN ASTIGMATISM ANGLE AND AN ASTIGMATISM MAGNITUDE ASSOCIATED WITH AN ORIGINAL ELECTRON HOLOGRAPHY (EH) IMAGE.

1104 — MODIFYING, BY THE SYSTEM, A PAIR OF SEQUENCED PARAMETERS OF AN ARRAY UPON WHICH THE EH IMAGE IS CONSTRUCTED, RESULTING IN A MODIFIED ARRAY.

B

1106 — MODIFYING, BY THE SYSTEM, THE PAIR OF SEQUENCED PARAMETERS USING THE ASTIGMATISM ANGLE AND THE ASTIGMATISM MAGNITUDE.

1108 — GENERATING, BY THE SYSTEM, A PROPAGATOR BEING A FUNCTION OF A SUMMATION OF SQUARES OF A MODIFIED PAIR OF SEQUENCED PARAMETERS RESULTING FROM THE MODIFYING.

1110 — GENERATING, BY THE SYSTEM, THE PROPAGATOR BEING A FUNCTION OF AN EXPONENTIAL OF A DISTANCE BETWEEN AN OBJECT AND AN EMITTER HAVING BEEN EMPLOYED TO GENERATE THE EH IMAGE OF THE OBJECT, A PHYSICAL SIZE OF A DETECTOR HAVING BEEN EMPLOYED TO RECEIVE ELECTRONS FROM THE EMITTER, AND A WAVELENGTH OF THE ELECTRONS.

1112 — GENERATING, BY THE SYSTEM, THE PROPAGATOR BEING A FUNCTION OF A SUMMATION OF SQUARES, OF AN INITIAL PAIR OF SEQUENCED PARAMETERS, WITH THE SUMMATION OF THE SQUARES MULTIPLIED BY AN ABERRATION CORRECTION FUNCTION COMPRISING AN ASTIGMATISM ADJUSTMENT USING THE ASTIGMATISM ANGLE AND ASTIGMATISM MAGNITUDE.

1114 — GENERATING, BY THE SYSTEM, THE PROPAGATOR BEING A FUNCTION OF A SUMMATION OF SQUARES, OF AN INITIAL PAIR OF SEQUENCED PARAMETERS, WITH THE SUMMATION OF THE SQUARES SUMMED WITH AN ABERRATION CORRECTION FUNCTION COMPRISING AN ASTIGMATISM ADJUSTMENT USING THE ASTIGMATISM ANGLE AND ASTIGMATISM MAGNITUDE.

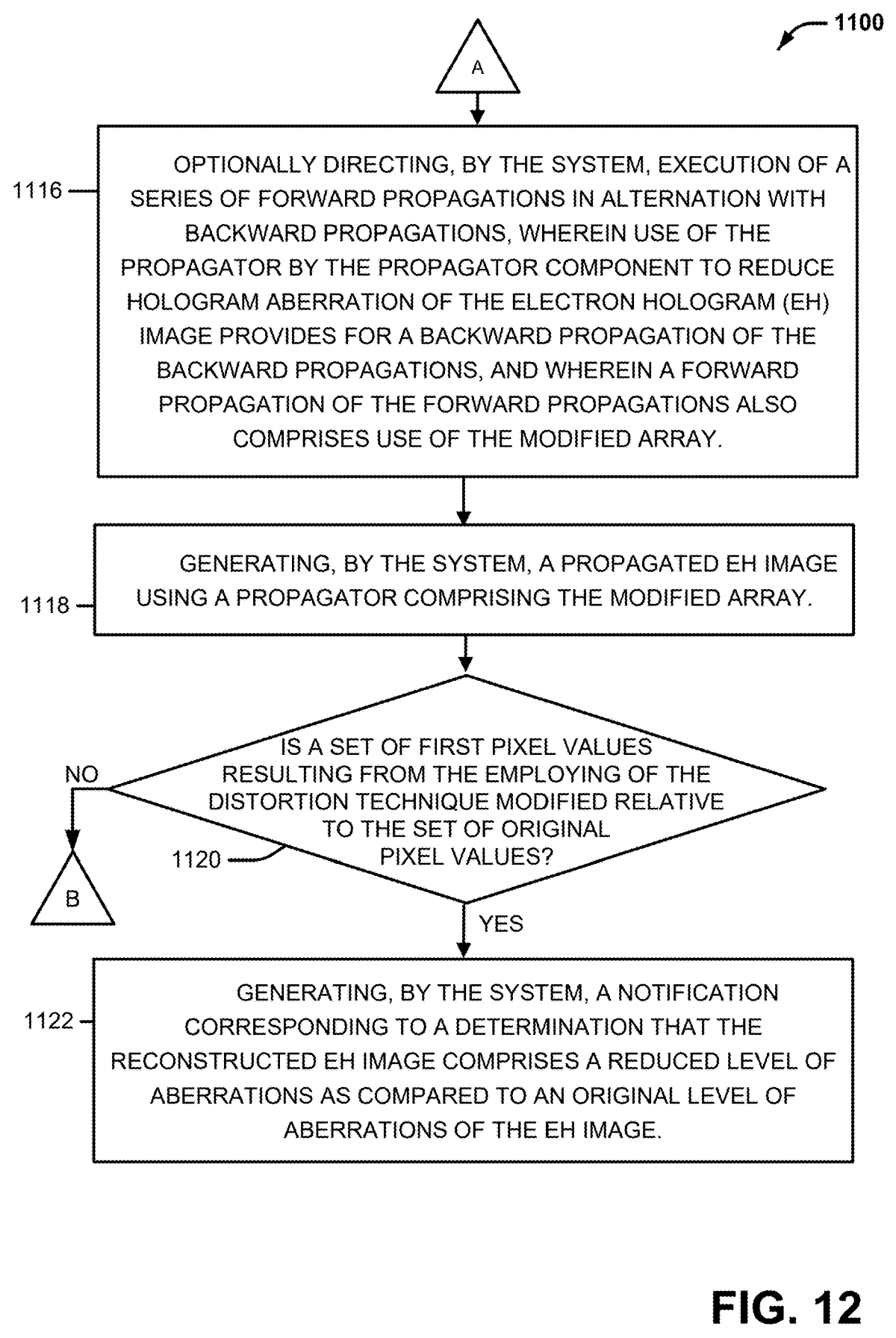

1116 — OPTIONALLY DIRECTING, BY THE SYSTEM, EXECUTION OF A SERIES OF FORWARD PROPAGATIONS IN ALTERNATION WITH BACKWARD PROPAGATIONS, WHEREIN USE OF THE PROPAGATOR BY THE PROPAGATOR COMPONENT TO REDUCE HOLOGRAM ABERRATION OF THE ELECTRON HOLOGRAM (EH) IMAGE PROVIDES FOR A BACKWARD PROPAGATION OF THE BACKWARD PROPAGATIONS, AND WHEREIN A FORWARD PROPAGATION OF THE FORWARD PROPAGATIONS ALSO COMPRISES USE OF THE MODIFIED ARRAY.

1118 — GENERATING, BY THE SYSTEM, A PROPAGATED EH IMAGE USING A PROPAGATOR COMPRISING THE MODIFIED ARRAY.

NO ← IS A SET OF FIRST PIXEL VALUES RESULTING FROM THE EMPLOYING OF THE DISTORTION TECHNIQUE MODIFIED RELATIVE TO THE SET OF ORIGINAL PIXEL VALUES?
1120 —

B

YES

1122 — GENERATING, BY THE SYSTEM, A NOTIFICATION CORRESPONDING TO A DETERMINATION THAT THE RECONSTRUCTED EH IMAGE COMPRISES A REDUCED LEVEL OF ABERRATIONS AS COMPARED TO AN ORIGINAL LEVEL OF ABERRATIONS OF THE EH IMAGE.

FIG. 12

REMOTE
COMPUTING
DEVICE
1340

PROCESSING
DEVICE
1302

STORAGE
DEVICE
1304

INTERFACE
DEVICE
1306

1308

SERVICE LOCAL
COMPUTING
DEVICE
1330

PROCESSING
DEVICE
1302

STORAGE
DEVICE
1304

INTERFACE
DEVICE
1306

1308

SCIENTIFIC
INSTRUMENT
1310

PROCESSING
DEVICE
1302

STORAGE
DEVICE
1304

INTERFACE
DEVICE
1306

1308

1308

USER LOCAL
COMPUTING
DEVICE
1320

PROCESSING
DEVICE
1302

STORAGE
DEVICE
1304

INTERFACE
DEVICE
1306

1308

1308

1312

CORRECTION OF ABERRATIONS IN IN-LINE ELECTRON HOLOGRAPHY

BACKGROUND

Scientific instruments for use in material analysis can aid in determining the makeup and properties of an unknown composition. In one or more examples, a scientific instrument can provide reconstruction in energy-based holograms to allow for better viewing of features of an unknown composition. Preparation of pixel data prior to the reconstruction can comprise one or more modifications of a raw or original energy-based holograms image. Additionally, and/or alternatively, preparation of pixel data prior to the reconstruction can comprise one or more correction determinations corresponding to hardware and/or software employed to acquire and/or generate a propagated version of the acquired hologram.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings. It is noted that one or more figures may comprise illustration of a blurred effect characterized by lack of clarity of an image.

FIG. 1 illustrates a block diagram of an example scientific instrument for performing one or more operations, in accordance with one or more embodiments described herein.

FIG. 10 illustrates a flow diagram of one or more processes that can be performed by the image preparation system of FIG. 8, in accordance with one or more embodiments described herein.

FIG. 11 illustrates another flow diagram of one or more processes that can be performed by the image preparation system of FIG. 8, in accordance with one or more embodiments described herein.

FIG. 12 illustrates a continuation of the flow diagram of FIG. 11 of one or more processes that can be performed by the image preparation system of FIG. 8, in accordance with one or more embodiments described herein.

SUMMARY

Figure 2:
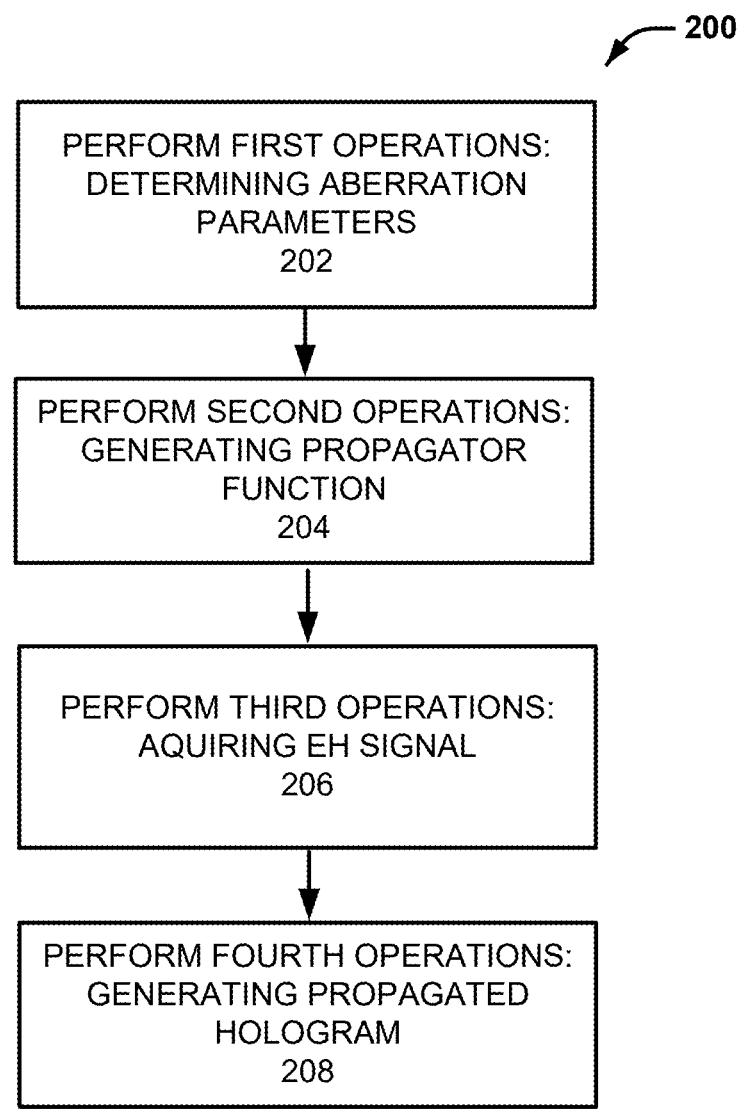
FIG. 2 illustrates a flow diagram of an example method of performing operations using the scientific instrument of FIG. 1, in accordance with one or more embodiments described herein.

The following presents a summary to provide a basic understanding of one or more embodiments described herein. This summary is not intended to identify key or critical elements, and/or to delineate scope of particular embodiments or scope of claims. Its sole purpose is to present concepts in a simplified form as a prelude to the more detailed description that is presented later. In one or more embodiments, systems, computer-implemented methods, apparatuses and/or computer program products described herein can provide a process for electron holography image propagation, and particularly to address one or more inconsistencies corresponding to propagator software and/or hardware employed to generate a propagated hologram. As a result, this process can provide a more accurate reconstruction of a hologram resulting from an electron holography imaging, such as electron energy hologram imaging (e.g., from application of an energy source to a target composition).

In accordance with an embodiment, a system can comprise a memory that stores computer executable components, and a processor that executes the computer executable components. The computer executable components can comprise a propagating component that reduces hologram aberration of an electron hologram (EH) image by modifying of a pair of sequenced parameters of an array upon which the EH image is constructed, resulting in a modified array; and a generating component that generates a propagated EH image using a propagator comprising the modified array.

As used herein, a "propagator" can refer to a calculation and/or model, represented as a function, of how electromagnetic waves propagate and/or how phase changes relative to an acquired EH signal.

In accordance with another embodiment, a computer-implemented method can comprise reducing, by a system operatively coupled to a processor, hologram aberration at an electron hologram (EH) image by modifying, by the system, a pair of sequenced parameters of a array upon which the EH image is constructed, resulting in a modified array; and generating, by the system, a propagated EH image using a propagator comprising the modified array.

In accordance with still another embodiment, a computer program product facilitates a process for electron holography aberration reduction, the program instructions executable by a processor to cause the processor to reduce, by the processor, hologram aberration at an electron hologram (EH) image by modifying, by the processor, a pair of sequenced parameters of a array upon which the EH image is constructed, resulting in a modified array; and generate, by the processor, a propagated EH image using a propagator comprising the modified array.

The one or more embodiments described herein can be implemented within, in connection with and/or coupled to an electron holography (EH) imaging device.

The one or more embodiments disclosed herein can achieve improved performance relative to existing approaches. For example, based at least on application of a propagator function to a pair of sequenced parameters of an array upon which the EH is constructed, aberration of the resultant propagated EH image and/or reconstructed EH image can be reduced.

As used herein, the term "aberration" can refer to astigmatism, coma, etc.

That is during the existing processes of backward propagation of the EH image from the detector to the object, aberration causing inaccurate acquisition of pixel data along one reference direction (e.g., a u or x direction) versus along a second reference direction (e.g., a v or y direction) can be adjusted by the use of the propagator function (also herein referred to as a propagator). In this way, a general blurring, contracting, expanding and/or skewing of a resultant propagated and/or reconstructed EH image (e.g., reconstructed subsequent to employment of the propagator) along one or more directions can be reduced, allowing for a more accurate reconstructed image to be generated. Accordingly, preparation of an electron holography (EH) signal upon which a reconstructed image is based can be made more accurate as compared to existing approaches that fail to recognize effects of such aberration.

DETAILED DESCRIPTION

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Various operations can be described as multiple discrete actions or operations in turn, in a manner that is most helpful in understanding the subject matter disclosed herein. However, the order of description should not be construed as to imply that these operations are necessarily order dependent. In particular, these operations can be performed in an order different from the order of presentation. Operations described can be performed in a different order from the described embodiment. Various additional operations can be performed, and/or described operations can be omitted in additional embodiments.

Turning now to the subject of material analysis and to the one or more embodiments described herein, one method of obtaining composition imaging can be electron imaging where a target composition is targeted by an energy source, ultimately resulting in a signal that can be employed to generate an energy-based hologram, such as an in-line electron hologram or for in-line holography by other waves and particles such as light (EM wave), sound (pressure wave) and/or neutron and/or proton waves (matter waves). That is, the embodiments described herein are applicable to different types of holograms, including in-line holograms, electron energy holograms and/or other types of holograms, even where only an example of an energy-based or electron energy hologram is used and/or described.

From the hologram, a reconstructed image of the target composition can be reconstructed. As used herein, an "emission pattern" is the underlying data signal corresponding to an image/hologram. As used herein, "image" can be used interchangeably with "hologram" and/or "holograph." As used herein, an "image" can refer to any image of any one or more objects, backgrounds, environments, targets, materials and/or the like.

The reconstruction can employ back propagation and/or forward propagation, among other methods. That is, reconstruction in holograms, such as low energy electron holograms (LEEH), can employ wave propagation techniques of Fourier optics. Holograms are measured by a detector with finite number of pixels (e.g. $-N/2 \times N/2$, or $N \times N$, such as $512 \times 512$). In one or more embodiments, the EH signal 551 itself can be inaccurate and/or misadjusted, such as due to electromagnetic interference, other signal and/or emission pattern interference, one or more aspects of noise and/or misalignment among hardware/software employed, and/or the like. In one or more embodiments, the EH signal 551 itself can be inaccurate and/or misadjusted, such as due to one or more aberrations in the original EH hologram 553 due to phase shift in electrons due to non-linear trajectories of the electrons having been emitted from the emitter 548, and thus affecting the EH signal 551. Non-linearity of electron trajectories could be caused by, for example, the shape of electric field from an imperfect object substrate alignment (e.g., alignment of an object 550 on a supporting substrate), or by ambient electromagnetic fields affecting the EAD 500. This inaccuracy and/or maladjustment can be unintentional and/or can be a natural and/or setup/configuration-caused. This can lead to image contamination, but also can lead to image aberration. As used herein, "aberration" refers to the expansion, contraction, stretching and/or skewing of a resulting reconstructed image. A type of aberration, astigmatism, can refer to such aberration in at least one direction along the hologram, relative to one or more other directions along the hologram.

To avoid image aberration, and thus provide aberration reduction of the EH signal upon which the reconstructed image is reconstructed, aberration reduction processing of an image, and/or of the signal upon which the image is based, can be performed. As a result, the expansion, contraction, stretching and/or skewing of a resulting reconstructed image in at least one direction along the hologram, relative to one or more other directions along the hologram, can be reduced and/or altogether removed. This can therefore aid in providing a more accurate reconstructed image.

Figure 9:
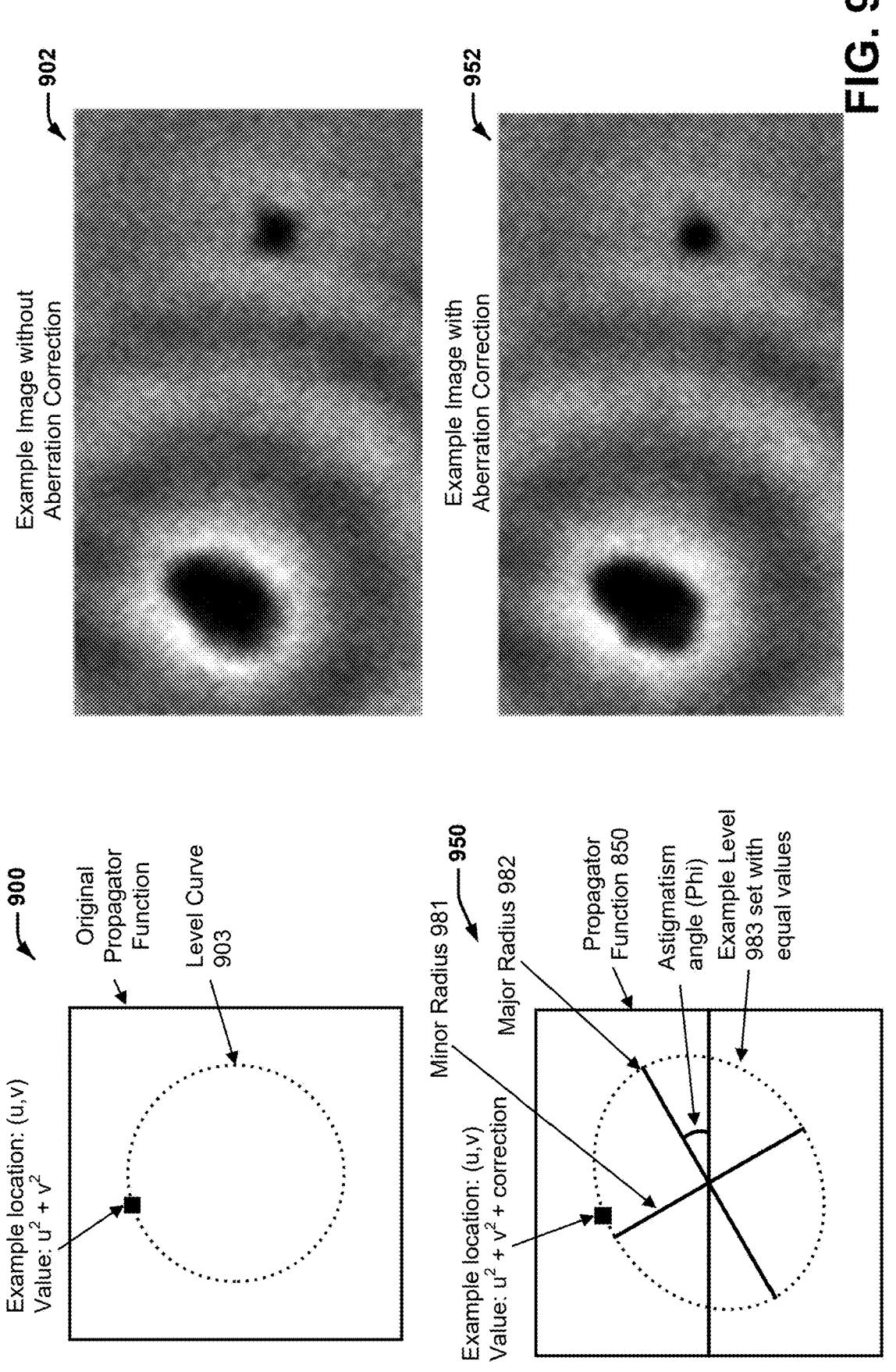
FIG. 9 illustrates a set of propagator functions that can be employed by the image preparation system of FIG. 8, in accordance with one or more embodiments described herein.

See, for example, FIG. 9, illustrating examples/images 900/902 prior to aberration reduction as compared to more accurate examples/images 950/952 after aberration reduction as can be provided by the one or more embodiments described herein. That is, by aberration-correcting a signal and/or image from which a hologram reconstruction can be generated, using the one or more embodiments described herein, reconstruction quality of the hologram reconstruction can be improved, as compared to existing signal and/or image preparation frameworks.

This inaccuracy and/or maladjustment can be unintentional and/or can be a natural and/or setup/configuration-caused. Indeed, in existing frameworks such aberration can be unfortunately ignored as an unadjustable and/or unintended consequence of the hardware, software, firmware, process and/or equipment employed for EH image and/or signal preparation. However, the inventors of the subject matter described herein have discovered that such aberration is at least reducible, if not reversible.

Therefore, to account for one or more inabilities and/or deficiencies of existing frameworks (e.g., existing image preparation frameworks), one or more embodiments are described herein that can employ a unique image preparation framework to achieve image aberration correction, thus allowing for accurate information gathering from a signal resulting from application of an energy stream to a target composition. One or more image preparation frameworks described herein can be hybrid frameworks and can perform modification of the image and/or underlying signal such as by a combination of one/or more blurring techniques along with application of one or more aberration-reduction techniques. With or without the additional blurring techniques, the one or more aberration-reduction techniques employed herein can increase subsequent image reconstruction quality. That is, undesired aberration (e.g., contraction, expansion, stretching and/or skewing) of an image and/or the pixels as generated from the acquired hologram signal during hologram signal acquisition can be reduced, limited and/or prevented.

Discussion next turns to a general discussion of one or more scientific instrument systems disclosed herein, as well as related methods, computing devices, and computer-readable media. For example, in one or more embodiments, a system can comprise a memory that stores computer executable components and a processor that executes the computer executable components stored in the memory. The computer executable components can comprise a propagating component that executes a modifying action relative to a set of sequenced parameters of an array upon which a hologram (e.g., original EH image) is constructed, resulting in a modified array, and a generating component that generates a set of modified pixel values, for a propagated hologram, based on the modified array.

Briefly, the modifying action can comprise direct modification of one or more of the sequenced parameters, addition of an aberration correction function to the sequenced parameters and/or multiplication of the sequenced parameters by an aberration correction function.

The one or more embodiments disclosed herein can achieve improved performance relative to existing approaches. For example, based on application of a combination of aberration parameter determination, aberration correction, backward propagating, and/or forward propagating, reduction in undesirable image aberration (e.g., aberration such as expansion, contraction, stretching and/or skewing) in connection with generation of an object image from the hologram can be provided. That is, use of the one or more aberration reduction frameworks discussed herein can allow for increase of accuracy, negating physical inconsistencies such as due to traversal of electrons between an emitter (e.g., of an electron holography device) and an object.

Moreover, an embodiment described herein can beneficially provide aberration reduction for plural targets at least partially in parallel with one another. For example, relative to holograms from two or more targets being acted on by two or more different energy sources, respective propagators can be determined, based on the particular electron holography devices being employed, at least partially in parallel with one another by a same image preparation system and/or separate image preparation system.

The embodiments disclosed herein thus can provide improvements to scientific instrument technology (e.g., improvements in the computer technology supporting such scientific instruments, among other improvements), which can be employed in various fields including optics, signal processing, spectroscopy, and nuclear magnetic resonance (NMR), without being limited thereto.

Various ones of the embodiments disclosed herein can improve upon existing approaches to achieve the technical advantages of high information and/or accurate information reconstructions corresponding to low aberration generation in such reconstructions. That is, use of the image preparation framework provided herein can greatly reduce generated image aberration by addressing system-caused aberration. It is noted that this is different from preventing the aberration outright.

Such technical advantages are not achievable by routine and/or existing approaches, and all user entities of systems including such embodiments can benefit from these advantages (e.g., by assisting the user entity in the performance of a technical task, such as identification of one or more target compositions, by means of an image preparation using an image preparation framework discussed herein).

The technical features of the embodiments disclosed herein (e.g., modification of the backward propagator and/or forward propagator employed to generate a propagated hologram) are thus decidedly unconventional in the field of material analysis, in addition to the fields of optics, signal processing, spectroscopy, and/or NMR, without being limited thereto, as are combinations of the features of the embodiments disclosed herein.

As discussed further herein, various aspects of the embodiments disclosed herein can improve the functionality of a computer itself. That is, the computational and user interface features disclosed herein do not involve only the collection and comparison of information but instead apply new analytical and technical techniques to change the operation of the computer-analysis of material compounds. For example, based on the parameters defining the acquiring of a signal obtained from an energy stream interacting with a target composition, and based on parameters defining aberration affecting the acquiring, a subsequent and automatic computer-directed process of image propagations can be made more accurate through preparation of a modified propagator. This modified propagator can be employed for generating one or more propagated holograms, resulting in one or more reconstructed holograms, each having a reduced effect of aberration (e.g., reduced inaccurate expansion, contraction, stretching and/or skewing in one or more directions. As such, one or more non-limiting systems described herein, comprising an image preparation system, can be self-improving by automatic provision and use of the modified propagator relative to the electron holography system and/or setup being employed for a particular use instance.

The present disclosure thus introduces functionality that neither an existing computing device, nor a human, could perform. Rather, such existing computing devices are ineffective at removal, recognition and/or processing of image aberration, resulting in loss or inaccurate aberration of signal corresponding to an original image generated by an image generated device (e.g., using LEEH). In view of the time, energy and/or loss of data involved, it is not practical to operate within the confines of existing approaches.

Accordingly, the embodiments of the present disclosure can serve any of a number of technical purposes, such as controlling a specific technical system or process; determining from measurements how to control a machine; digital audio, image, or video enhancement or analysis; separation of material sources in a mixed signal; generating data for reliable and/or efficient transmission or storage; providing estimates and confidence intervals for material samples; or providing a faster processing of sensor data. In particular, the present disclosure provides technical solutions to technical problems, including, but not limited to, hologram modification; image/signal blurring; application of combined blurring techniques; and/or subsequent image reconstruction, resulting in a faster, more thorough and/or more efficient processing of generated images and thus of material samples or other target compositions being imaged.

The embodiments disclosed herein thus provide improvements to material analysis technology (e.g., improvements in the computer technology supporting material analysis, among other improvements).

As used herein, the phrase "based on" should be understood to mean "based at least in part on," unless otherwise specified.

As used herein, the term "component" can refer to an atomic element, molecular element, phase of an atomic or molecular element, or combination thereof. As used herein, the term "data" can comprise metadata.

As used herein, the terms "entity," "requesting entity," and "user entity" can refer to a machine, device, component, hardware, software, smart device, party, organization, individual and/or human.

One or more embodiments are now described with reference to the drawings, where like referenced numerals are used to refer to like drawing elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein.

Turning now in particular to the one or more figures, and first to FIG. 1, illustrated is a block diagram of a scientific instrument module 100 for performing material analysis operations using a combination hologram blurring technique, in accordance with various embodiments described herein. The scientific instrument module 100 can be implemented by circuitry (e.g., including electrical and/or optical components), such as a programmed computing device. The logic of the scientific instrument module 100 can be included in a single computing device or can be distributed across multiple computing devices that are in communication with each other as appropriate. Examples of computing devices that can, singly or in combination, implement the scientific instrument module 100 are discussed herein with reference to the computing device 400 of FIG. 4, and examples of systems of interconnected computing devices, in which the scientific instrument module 100 can be implemented across one or more of the computing devices, is discussed herein with reference to the scientific instrument system 2100 of FIG. 21.

The scientific instrument module 100 can include first logic 102, second logic 104, third logic 106, and fourth logic 108. As used herein, the term "logic" can include an apparatus that is to perform a set of operations associated with the logic. For example, any of the logic elements included in the module 100 can be implemented by one or more computing devices programmed with instructions to cause one or more processing devices of the computing devices to perform the associated set of operations. In a particular embodiment, a logic element can include one or more non-transitory computer-readable media having instructions thereon that, when executed by one or more processing devices of one or more computing devices, cause the one or more computing devices to perform the associated set of operations. As used herein, the term "module" can refer to a collection of one or more logic elements that, together, perform a function associated with the module. Different ones of the logic elements in a module can take the same form or can take different forms. For example, some logic in a module can be implemented by a programmed general-purpose processing device, while other logic in a module can be implemented by an application-specific integrated circuit (ASIC). In another example, different ones of the logic elements in a module can be associated with different sets of instructions executed by one or more processing devices. A module can omit one or more of the logic elements depicted in the associated drawing; for example, a module can include a subset of the logic elements depicted in the associated drawing when that module is to perform a subset of the operations discussed herein with reference to that module.

The first logic 102 can receive, find, locate, download, request, measure and/or otherwise determine an astigmatism angle Phi and an astigmatism magnitude m associated with an astigmatism affecting an original EH signal. That is, the first logic 102 can obtain data for being processed and for subsequent use in generating a propagator (e.g., propagator function, whether a backward propagator function or a forward propagator function).

The second logic 104 can generate the propagator function by employing a pair of sequenced parameters of an array upon which an original EH hologram, based on the original EH signal, is constructed. That is, the second logic 104 can employ the output of the first logic 102 to generate a propagator function that can be employed to generate a modified array of pixels.

The third logic 106 can receive, find, locate, download, request and/or otherwise obtain a signal corresponding to an energy-based hologram (e.g., resulting from electron input to a target composition). That is, the first logic 102 can obtain data for being processed and for subsequent use in generating a reconstructed image of a target, such as a target composition.

The fourth logic 108 can generate one or more resultant pixel values based on use of the modified array (and thus based on use of the propagator), output from the second logic 104, as applied to the acquired signal output from the third logic 106. That is, the fourth logic 108 can generate pixel values corresponding to luminosity values and/or color values of one or more pixels comprised by a modified image (e.g., an image acted upon due to the second logic 104 and/or third logic 106).

FIG. 2 illustrates a flow diagram of a method 200 of performing operations, by the scientific instrument module 100, in accordance with various embodiments. Although the operations of the method 200 can be illustrated with reference to particular embodiments disclosed herein (e.g., the scientific instrument module 100 discussed herein with reference to FIG. 1, the GUI 300 discussed herein with reference to FIG. 3, the computing device 400 discussed herein with reference to FIG. 4, and/or the scientific instrument system 1300 discussed herein with reference to FIG. 13), the method 200 can be used in any suitable setting to perform any suitable operations. Operations are illustrated once each and in a particular order in FIG. 2, but the operations can be reordered and/or repeated as desired and appropriate (e.g., different operations performed can be performed in parallel, as suitable).

At 202, first operations can be performed. For example, the first logic 102 of the module 100 can perform the first operations 202. The first operations 202 can include receiving, finding, locating, downloading, requesting, measuring and/or otherwise determining data comprising an astigmatism angle Phi and an astigmatism magnitude m associated with an astigmatism aberration affecting the original EH signal 551.

At 204, second operations can be performed. For example, the second logic 104 of the module 100 can perform the second operations 204. The second operations 204 can comprise employing the output of the first operations 202 to generate a propagator function that can be employed to generate a modified array of pixels.

At 206, third operations can be performed. For example, the third logic 106 of the module 100 can perform the third operations 206. The third operations 206 can comprise obtaining a signal corresponding to an energy-based hologram (e.g., resulting from electron input to a target composition).

At 208, fourth operations can be performed. For example, the fourth logic 108 of the module 100 can perform the fourth operations 208. The fourth operations 208 can comprise generation of a set of pixel values for a set of pixels comprised by a propagated EH image that is based on an original EH image. This set of pixel values can be employed to generate an image reconstruction, for example.

Figure 13:
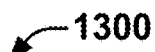
FIG. 13 illustrates a block diagram of example scientific instrument system in which one or more of the methods described herein can be performed, in accordance with one or more embodiments described herein.

The scientific instrument methods disclosed herein can include interactions with a user entity (e.g., via the user local computing device 1320 discussed herein with reference to FIG. 13). These interactions can include providing information to the user entity (e.g., information regarding the operation of a scientific instrument such as the scientific instrument 1310 of FIG. 13, information regarding a sample being analyzed or other test or measurement performed by a scientific instrument, information retrieved from a local or remote database, or other information) or providing an option for a user entity to input commands (e.g., to control the operation of a scientific instrument such as the scientific instrument 1310 of FIG. 13, or to control the analysis of data generated by a scientific instrument), queries (e.g., to a local or remote database), or other information. In some embodiments, these interactions can be performed through a graphical user interface (GUI) that includes a visual display on a display device (e.g., the display device 410 discussed herein with reference to FIG. 4) that provides outputs to the user entity and/or prompts the user entity to provide inputs (e.g., via one or more input devices, such as a keyboard, mouse, trackpad, or touchscreen, included in the other I/O devices 412 discussed herein with reference to FIG. 4). The scientific instrument system 1300 disclosed herein can include any suitable GUIs for interaction with a user entity.

Figure 3:
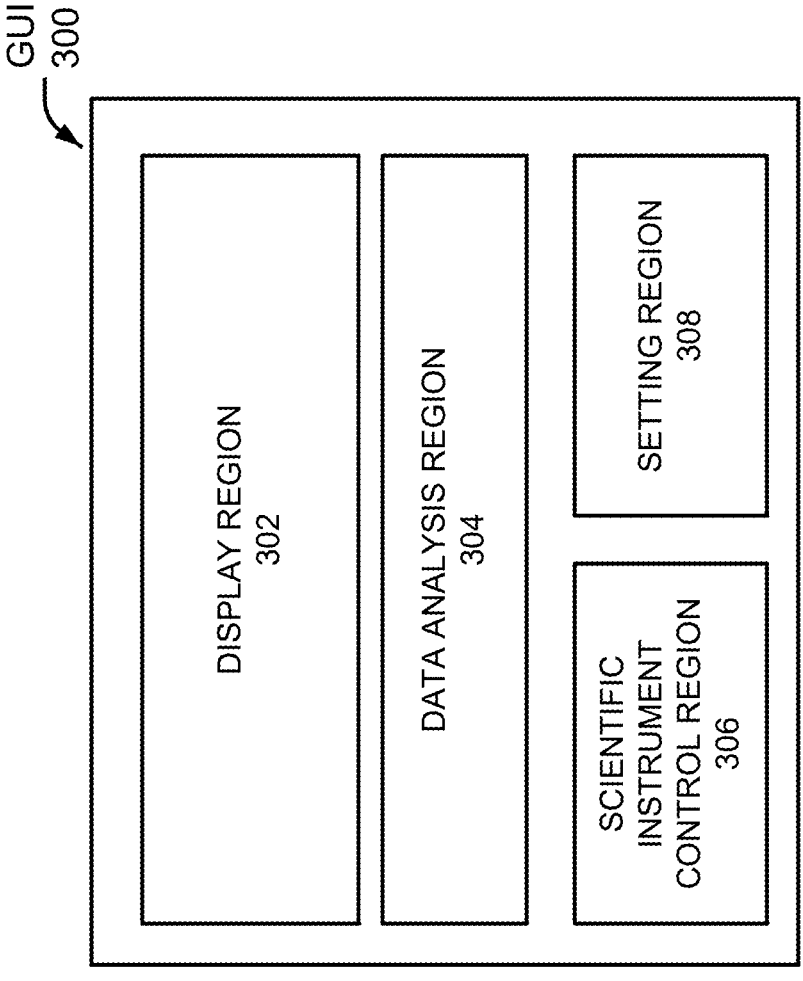
FIG. 3 illustrates a graphical user interface (GUI) that can be used in the performance of one or more of the methods described herein, in accordance with one or more embodiments described herein.

Turning next to FIG. 3, depicted is an example GUI 300 that can be used in the performance of one or more of the methods described herein, in accordance with various embodiments described herein. As noted above, the GUI 300 can be provided on a display device (e.g., the display device

Figure 4:
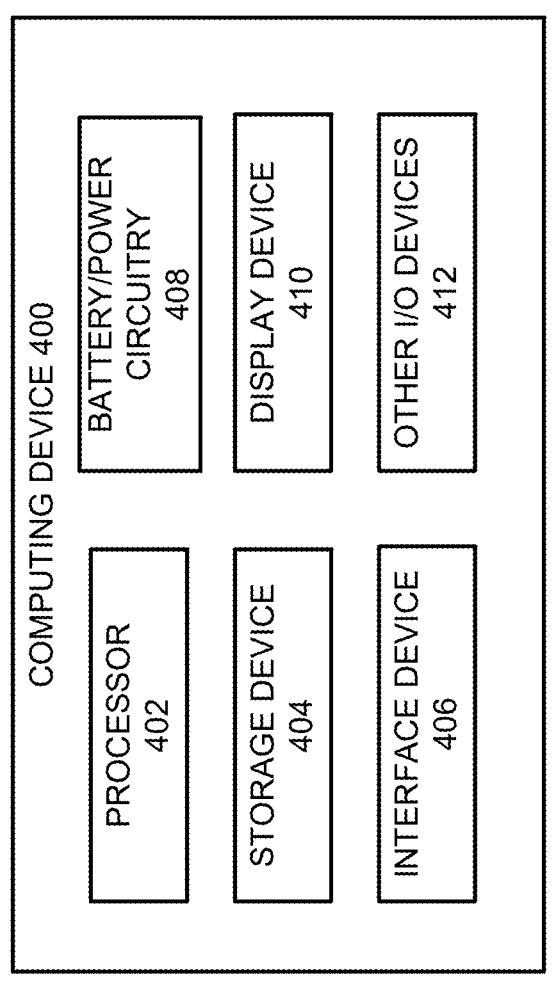
FIG. 4 illustrates a block diagram of an example computing device that can perform one or more of the methods disclosed herein, in accordance with one or more embodiments described herein.

410 discussed herein with reference to FIG. 4) of a computing device (e.g., the computing device 400 discussed herein with reference to FIG. 4) of a scientific instrument system (e.g., the scientific instrument system 1300 discussed herein with reference to FIG. 13), and a user entity can interact with the GUI 300 using any suitable input device (e.g., any of the input devices included in the other I/O devices 412 discussed herein with reference to FIG. 4) and input technique (e.g., movement of a cursor, motion capture, facial recognition, gesture detection, voice recognition, actuation of buttons, etc.).

The GUI 300 can include a data display region 302, a data analysis region 304, a scientific instrument control region 306, and a settings region 308. The particular number and arrangement of regions depicted in FIG. 3 is merely illustrative, and any number and arrangement of regions, including any desired features thereof, can be included in a GUI 300.

The data display region 302 can display data generated by a scientific instrument (e.g., the scientific instrument 1310 discussed herein with reference to FIG. 13). For example, the data display region 302 can display one or more output results which can comprise text, graphs, notification, charts, matrices and/or spectra, without being limited thereto.

The data analysis region 304 can display the results of data analysis (e.g., the results of analyzing the data illustrated in the data display region 302 and/or other data). For example, the data analysis region 304 can display one or more of the output results. In one or more cases, the data analysis region 304 can display a list, flow chart or other schematic of acquisition actions taken and/or recommended relative to an experiment. In one or more embodiments, the data display region 302 and the data analysis region 304 can be combined in the GUI 300 (e.g., to include data output from a scientific instrument, and some analysis of the data, in a common graph or region).

The scientific instrument control region 306 can include options that allow the user entity to control a scientific instrument (e.g., the scientific instrument 1310 discussed herein with reference to FIG. 13). For example, the scientific instrument control region 306 can include one or more controls for inputting one or more metrics of interest, device and/or setup parameters, and/or aberration parameters (e.g., astigmatism parameters).

The settings region 308 can include options that allow the user entity to control the features and functions of the GUI 300 (and/or other GUIs) and/or perform common computing operations with respect to the data display region 302 and data analysis region 304 (e.g., saving data on a storage device, such as the storage device 404 discussed herein with reference to FIG. 4, sending data to another user entity, labeling data, etc.). For example, the settings region 308 can include one or more options to alter color, fill or format of illustrations, such as an illustration of any aspect of FIG. 9 and/or other image, whether actual, representative and/or schematic, to be described below.

As noted above, the scientific instrument module 100 can be implemented by one or more computing devices. Accordingly, discussion next turns to FIG. 4, which illustrates a block diagram of a computing device 400 that can perform some or all of the scientific instrument methods disclosed herein, in accordance with various embodiments. In one or more embodiments, the scientific instrument module 100 can be implemented by a single computing device 400 or by multiple computing devices 400. Further, as discussed below, a computing device 400 (or multiple computing devices 400) that implements the scientific instrument module 100 can be part of one or more of the scientific instrument 1310, the user local computing device 1320, the service local computing device 1330, or the remote computing device 1340 of FIG. 13.

The computing device 400 of FIG. 4 is illustrated as having a number of components, but any one or more of these components can be omitted or duplicated, as suitable for the application and setting. As illustrated, these components can include one or more of a processor 402, storage device 404, interface device 406, battery/power circuitry 408, display device 410 and other input/output (I/O) devices 412, as will be described below.

In one or more embodiments, one or more of the components included in the computing device 400 can be attached to one or more motherboards and enclosed in a housing (e.g., including plastic, metal, and/or other materials). In one or more embodiments, some these components can be fabricated onto a single system-on-a-chip (SoC) (e.g., an SoC can include one or more processors 402 and one or more storage devices 404). Additionally, in one or more embodiments, the computing device 400 can omit one or more of the components illustrated in FIG. 4. In one or more embodiments, the computing device 400 can include interface circuitry (not shown) for coupling to the one or more components using any suitable interface (e.g., a Universal Serial Bus (USB) interface, a High-Definition Multimedia Interface (HDMI) interface, a Controller Area Network (CAN) interface, a Serial Peripheral Interface (SPI) interface, an Ethernet interface, a wireless interface, or any other appropriate interface). For example, the computing device 400 can omit a display device 410, but can include display device interface circuitry (e.g., a connector and driver circuitry) to which a display device 410 can be coupled.

The computing device 400 can include the processor 402 (e.g., one or more processing devices). As used herein, the term "processing device" can refer to any device or portion of a device that processes electronic data from registers and/or memory to transform that electronic data into other electronic data that can be stored in registers and/or memory. The processor 402 can include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices.

The computing device 400 can include a storage device 404 (e.g., one or more storage devices). The storage device 404 can include one or more memory devices such as random access memory (RAM) (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices. In one or more embodiments, the storage device 404 can include memory that shares a die with a processor 402. In such an embodiment, the memory can be used as cache memory and can include embedded dynamic random-access memory (eDRAM) or spin transfer torque magnetic random-access memory (STT-MRAM), for example. In one or more embodiments, the storage device 404 can include non-transitory computer readable media having instructions thereon that, when executed by one or more processing devices (e.g., the processor 402), cause the computing device 400 to perform any appropriate ones of or portions of the methods disclosed herein.

The computing device 400 can include an interface device 406 (e.g., one or more interface devices 406). The interface device 406 can include one or more communication chips, connectors, and/or other hardware and software to govern communications between the computing device 400 and other computing devices. For example, the interface device 406 can include circuitry for managing wireless communications for the transfer of data to and from the computing device 400. The term "wireless" and its derivatives can be used to describe circuits, devices, systems, methods, techniques, communications channels, etc., that can communicate data through the use of modulated electromagnetic radiation through a nonsolid medium. The term does not imply that the associated devices do not contain any wires, although in one or more embodiments the associated devices might not contain any wires. Circuitry included in the interface device 406 for managing wireless communications can implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). In one or more embodiments, circuitry included in the interface device 406 for managing wireless communications can operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. In one or more embodiments, circuitry included in the interface device 406 for managing wireless communications can operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). In one or more embodiments, circuitry included in the interface device 406 for managing wireless communications can operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. In one or more embodiments, the interface device 406 can include one or more antennas (e.g., one or more antenna arrays) to receipt and/or transmission of wireless communications.

In one or more embodiments, the interface device 406 can include circuitry for managing wired communications, such as electrical, optical, or any other suitable communication protocols. For example, the interface device 406 can include circuitry to support communications in accordance with Ethernet technologies. In one or more embodiments, the interface device 406 can support both wireless and wired communication, and/or can support multiple wired communication protocols and/or multiple wireless communication protocols. For example, a first set of circuitry of the interface device 406 can be dedicated to shorter-range wireless communications such as Wi-Fi or Bluetooth, and a second set of circuitry of the interface device 406 can be dedicated to longer-range wireless communications such as global positioning system (GPS), EDGE, GPRS, CDMA, WiMAX, LTE, EV-DO, or others. In one or more embodiments, a first set of circuitry of the interface device 406 can be dedicated to wireless communications, and a second set of circuitry of the interface device 406 can be dedicated to wired communications.

The computing device 400 can include battery/power circuitry 408. The battery/power circuitry 408 can include one or more energy storage devices (e.g., batteries or capacitors) and/or circuitry for coupling components of the computing device 400 to an energy source separate from the computing device 400 (e.g., AC line power).

The computing device 400 can include a display device 410 (e.g., multiple display devices). The display device 410 can include any visual indicators, such as a heads-up display, a computer monitor, a projector, a touchscreen display, a liquid crystal display (LCD), a light-emitting diode display, or a flat panel display.

The computing device 400 can include other input/output (I/O) devices 412. The other I/O devices 412 can include one or more audio output devices (e.g., speakers, headsets, earbuds, alarms, etc.), one or more audio input devices (e.g., microphones or microphone arrays), location devices (e.g., GPS devices in communication with a satellite-based system to receive a location of the computing device 400, as known in the art), audio codecs, video codecs, printers, sensors (e.g., thermocouples or other temperature sensors, humidity sensors, pressure sensors, vibration sensors, accelerometers, gyroscopes, etc.), image capture devices such as cameras, keyboards, cursor control devices such as a mouse, a stylus, a trackball, or a touchpad, bar code readers, Quick Response (QR) code readers, or radio frequency identification (RFID) readers, for example.

The computing device 400 can have any suitable form factor for its application and setting, such as a handheld or mobile computing device (e.g., a cell phone, a smart phone, a mobile internet device, a tablet computer, a laptop computer, a netbook computer, an ultrabook computer, a personal digital assistant (PDA), an ultra mobile personal computer, etc.), a desktop computing device, or a server computing device or other networked computing component.

Figure 5:
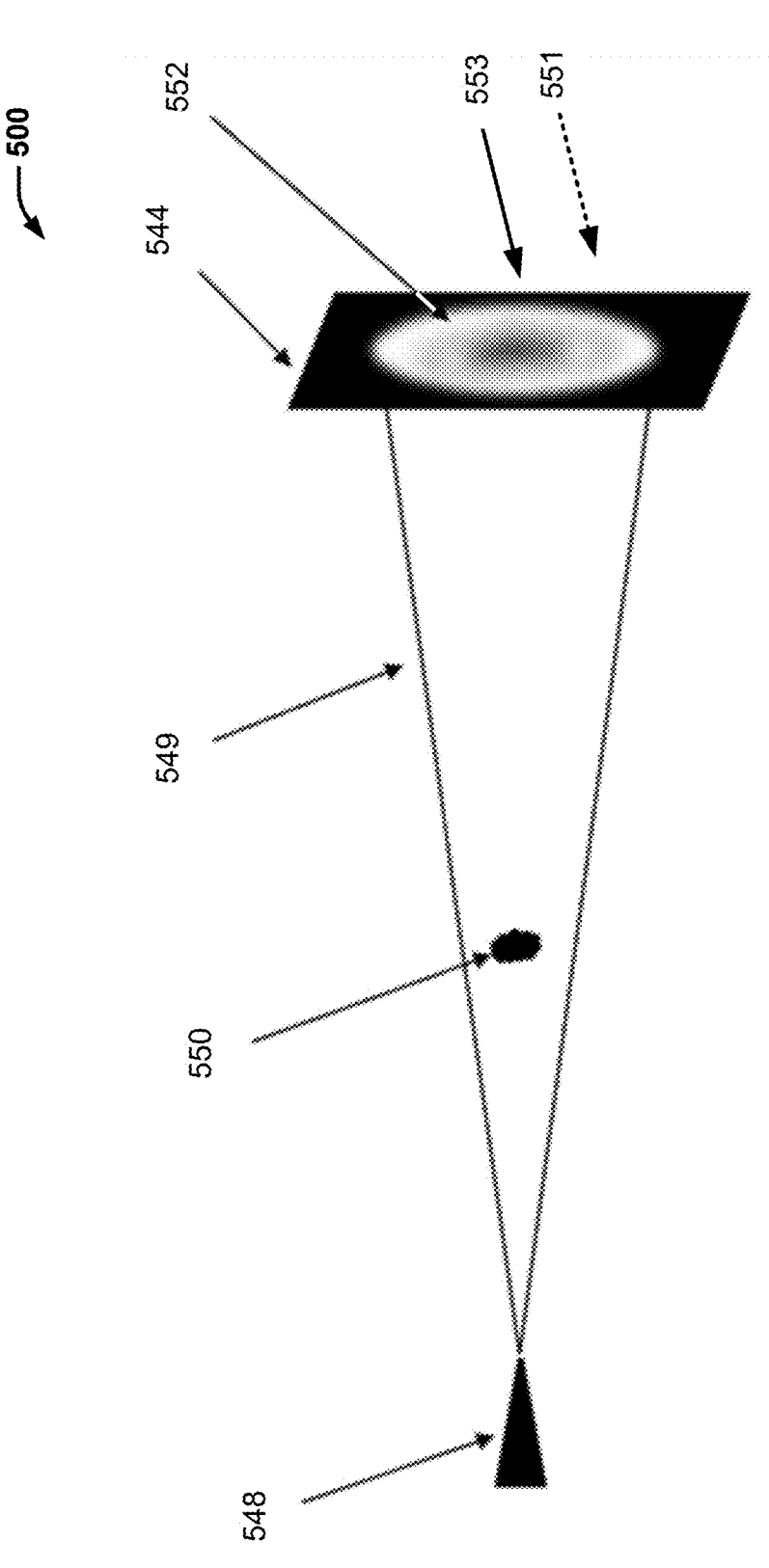
FIG. 5 illustrates a schematic diagram of an image generation device, in accordance with one or more embodiments described herein.
Figure 6:
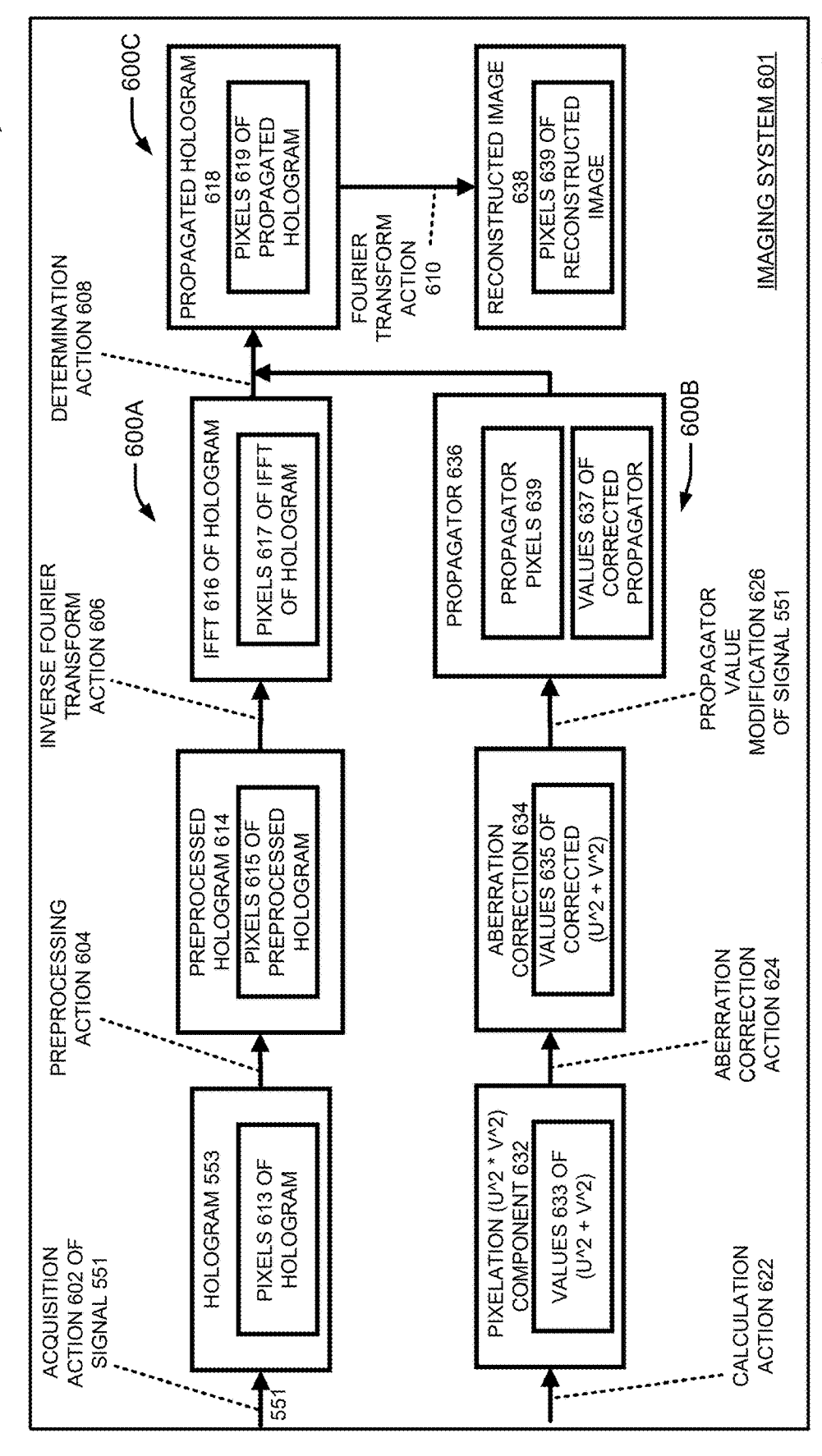
FIG. 6 illustrates flow diagram of a set of processes of which one or more can be employed by the image preparation systems of FIGS. 7 and 8, in accordance with one or more embodiments described herein.

Referring next to FIGS. 5 and 6, illustrated is an imaging device (e.g., an electron application device 500) at FIG. 5 and one or more schematic flow diagrams (e.g., flow diagram 600 at FIG. 6) of various processes that can be performed in association with the electron application device 500.

As illustrated at FIG. 5, an electron application device 500 or other imaging device can comprise an energy source, such as an electron source 548, a sample 550 or other target or target composition, and a detector 544, such as an electron detector. It is noted that a distance between any of the object 550, the emitter 548 (e.g., electron source 548) and the detector 544 can be exaggerated at FIG. 5 for illustration purposes. The electron source 548 can generate an electron projection path 549 causing an image signal 551 to be produced as a result of interaction of electrons from the electron source 548 at the detector 544. An image produced can comprise an original image 553 comprising a projected hologram image 552 of the sample 550.

As schematically depicted at FIG. 6, two sub-sets of parallel processes can be performed by an imaging system 601 comprising, and/or communicatively coupled to, the electron application device 500, resulting in the reconstructed image 638. A first sub-set of processes 600A can comprise use of the electron application device 500 and can result in a propagated hologram 618. A second sub-set of processes 600B can comprise determination of an aberration correction 634 for employment with a propagator 636, which propagator 636 can be employed to generate the propagated hologram. That is, use of the propagator 636 at a determination action 608 can be a point of combination of the first sub-set of processes and the second sub-set of processes 600B. Put another way, the determination action 608 can comprise use of the propagator 636 and the acquired original hologram 553 (e.g., the IFFT 616 resulting from the original hologram 553, more particularly).

It is noted that a majority of the actions of the first sub-set of processes 600A, and of a tertiary sub-set of processes 600C (e.g., resulting from the determination action 608) are described herein only briefly to provide background for detailed description relative to the second sub-set of processes 600B.

Accordingly, turning first briefly to the first sub-set of processes 600A, in accordance with the description of the electron application device 500 of FIG. 5, the imaging system 601 can perform the first sub-set of processes 600A. An acquisition action 602 can be performed resulting in acquiring of the hologram 552 which can be at least partially described according to a set of hologram pixels 613 of the hologram 552. One or more pre-processing actions 604 can be performed by the imaging system 601 resulting in a preprocessed hologram 614 having preprocessed pixels 615. A pre-processing action 604 can comprise, but is not limited to, hologram spatial equalization, hologram normalization and/or hologram apodization. Further, the imaging system 601 can perform an inverse Fourier transform action 606 by applying an inverse Fourier transform (IFFT) 616 to the preprocessed hologram 614, resulting in a IFFT hologram having pixels 617. Thereafter, a determination action 608 can be performed by the imaging system 601, such as employing a propagator 636 and associated aberration correction 634, based on the second sub-set of processes 600B.

Turning next only briefly to the second sub-set of processes 600B, to be further detailed below relative to FIGS. 7-9, a first calculation action 622 can be performed by the imaging system 601 relative to the propagator 636, and more particularly relative to the pixels 639 of the propagator 636. Following the calculation action 622, the imaging system 601 further can perform an aberration correction action 624 and a propagator value modification action 626, to be described below in detail.

Figure 7:
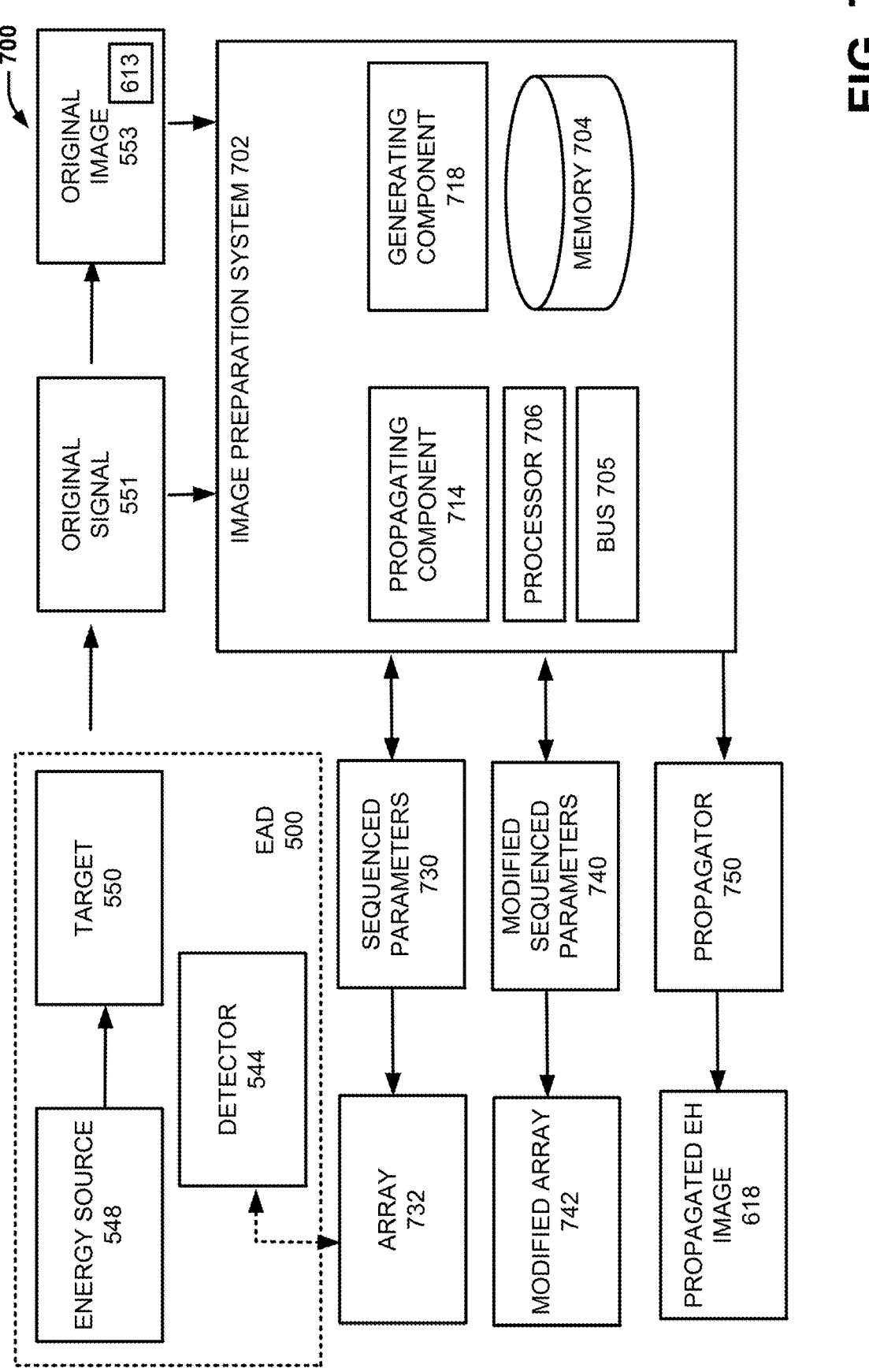
FIG. 7 illustrates a block diagram of an example, non-limiting system that can facilitate a process for electron holography image background extraction, in accordance with one or more embodiments described herein.
Figure 8:
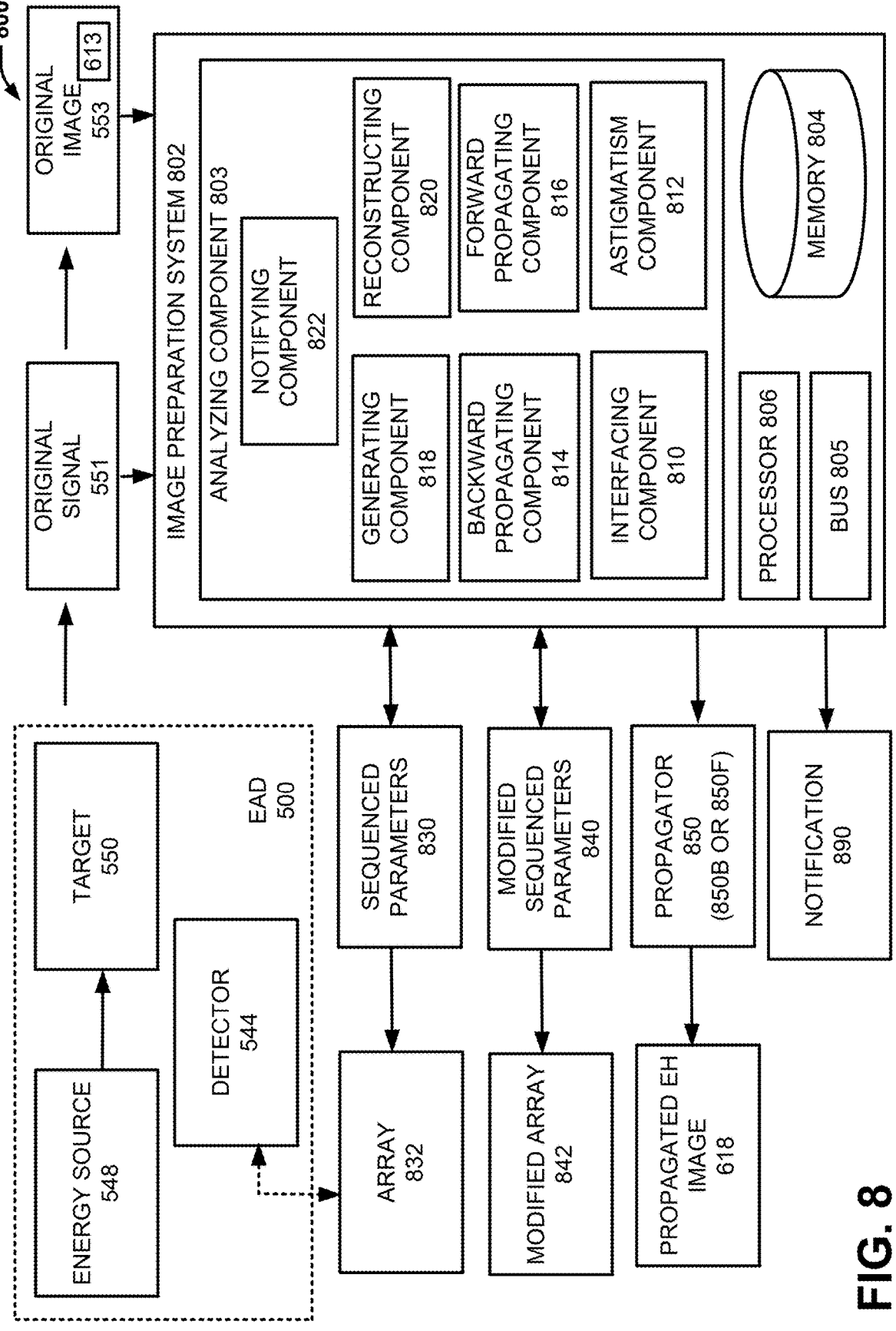
FIG. 8 illustrates a block diagram of another example, non-limiting system that can facilitate a process for electron holography image background extraction, in accordance with one or more embodiments described herein.
Figure 15:
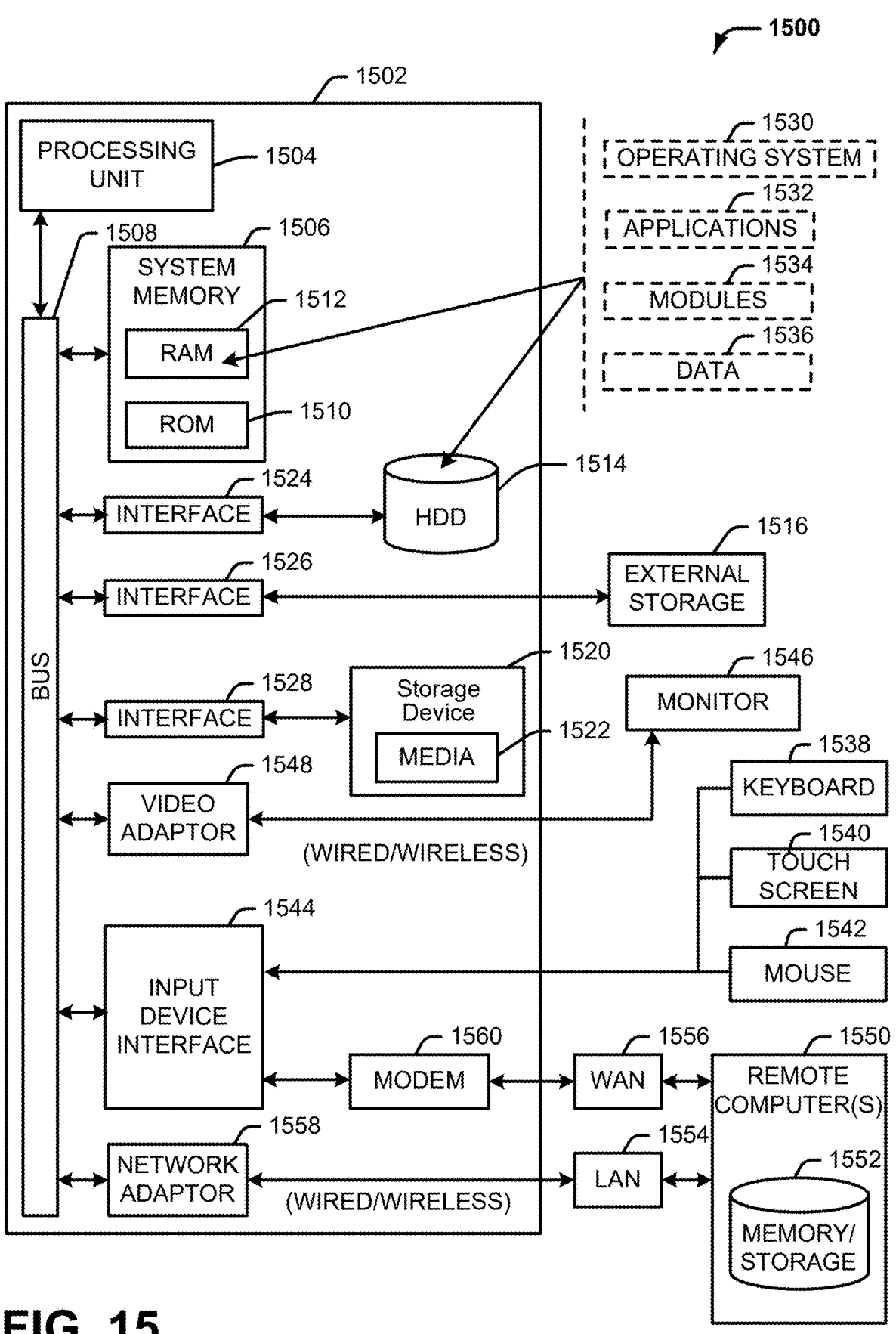
FIG. 15 illustrates an example schematic block diagram of a computing environment with which the subject matter described herein can interact and/or be implemented at least in part.

Referring now to FIGS. 7 and 8, in one or more embodiments, the non-limiting systems 700 and/or 800 illustrated at FIGS. 7 and 8, and/or systems thereof, can further comprise one or more computer and/or computing-based elements described herein with reference to a computing environment, such as the computing environment 1500 illustrated at FIG. 15. In one or more described embodiments, computer and/or computing-based elements can be used in connection with implementing one or more of the systems, devices, components and/or computer-implemented operations shown and/or described in connection with FIGS. 7 and/or 8 and/or with other figures described herein.

Turning first to FIG. 7, the figure illustrates a block diagram of an example, non-limiting system 800 that can comprise an image preparation system 702 and an electron application device (EAD) 500. The image preparation system 702 can facilitate a process for electron holography aberration reduction of an original signal 551/original image 553, based on output from the electron application device 500. The non-limiting system 700 can be employed in connection with a holography system, such as an in-line electron or laser holography system, such as comprising the EAD 500.

In one or more embodiments, the image preparation system 702 can be at least partially comprised by the computing device 400.

In one or more embodiments, the image preparation system 902 can at least partially comprise the energy application device 500 and/or vice versa.

It is noted that the image preparation system 702 is only briefly detailed to provide but a lead-in to a more complex and/or more expansive image preparation system 802 as illustrated at FIG. 8. That is, further detail regarding processes that can be performed by one or more embodiments described herein will be provided below relative to the non-limiting system 800 of FIG. 8.

Still referring to FIG. 7, the image preparation system 702 can comprise at least a memory 704, bus 705, processor 706, propagating component 714, and/or generating component 718. The processor 706 can be the same as the processor 402, comprised by the processor 402 or different therefrom. The memory 704 can be the same as the storage device 404, comprised by the storage device 404 or different therefrom.

Using the above-noted components, the image preparation system 702 can facilitate a process to at least partially modify the original image 553, and/or the original EH signal 551 corresponding thereto, to at least partially reduce aberration thereof.

Generally, the propagating component 714 can reduce hologram aberration of the electron hologram (EH) image 553 by modifying of a pair of sequenced parameters u and v (e.g., x and y) 730 of an array 732 upon which the EH image 553 is constructed, resulting in a modified array 742 comprising modified sequenced parameters 740.

Briefly, the modifying action can comprise direct modification of one or more of the sequenced parameters, addition of an aberration correction function to the sequenced parameters and/or multiplication of the sequenced parameters by an aberration correction function.

The generating component 718 can generate the propagated EH image 618 using a propagator 750 (e.g., propagator function 750) comprising the modified array 742.

As a result of these components, a reduction in image and/or signal aberration can be facilitated, which reduction can be pixel-by-pixel based, as will described below in greater detail relative to FIG. 8.

The propagating component 714 and/or generating component 718 can be operatively coupled to the processor 706 which can be operatively coupled to the memory 704. The bus 705 can provide for the operative coupling. The processor 706 can facilitate execution of the propagating component 714 and/or generating component 718. The propagating component 714 and/or generating component 718 can be stored at the memory 704.

In general, the non-limiting system 700 can employ any suitable method of communication (e.g., electronic, communicative, internet, infrared, fiber, etc.) to provide communication between the image preparation system 702, the electron application device 500 and/or any device associated with a user entity.

Turning next to FIG. 8, a non-limiting system 800 is illustrated that can comprise an image preparation system 802 and electron application device 500. Repetitive description of like elements and/or processes employed in respective embodiments is omitted for sake of brevity. Description relative to an embodiment of FIG. 7 can be applicable to an embodiment of FIG. 8. Likewise, description relative to an embodiment of FIG. 8 can be applicable to an embodiment of FIG. 7.

Generally, the image preparation system 802 can facilitate a process to at least partially modify the original image 553, and/or the original EH signal 551 corresponding thereto, to at least partially reduce aberration thereof.

The non-limiting system 800 can be employed in connection with a holography system, such as an in-line electron or laser holography system comprising the electron application device 500.

In one or more embodiments, the image preparation system 802 can be at least partially comprised by the computing device 400.

One or more communications between one or more components of the non-limiting system 800 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The image preparation system 802 can be associated with, such as accessible via, a cloud computing environment, such as the cloud computing environment 1500 of FIG. 15.

The image preparation system 802 can comprise a plurality of components. The components can comprise a memory 804, processor 806, bus 805, interfacing component 810, aberration component 812, backward propagating component 814, forward propagating component 816, generating component 818, reconstructing component 820 and/or notifying component 822. Using these components, the image preparation system 802 can output at least a propagator 850 (e.g., propagator 636), propagated EH image 618 and/or propagated pixels 619 corresponding to the propagated EH image 618.

Discussion next turns to the processor 806, memory 804 and bus 805 of the image preparation system 802. For example, in one or more embodiments, the image preparation system 802 can comprise the processor 806 (e.g., computer processing unit, microprocessor, classical processor, quantum processor and/or like processor). In one or more embodiments, a component associated with image preparation system 802, as described herein with or without reference to the one or more figures of the one or more embodiments, can comprise one or more computer and/or machine readable, writable and/or executable components and/or instructions that can be executed by processor 806 to provide performance of one or more processes defined by such component and/or instruction. In one or more embodiments, the processor 806 can comprise the interfacing component 810, aberration component 812, backward propagating component 814, forward propagating component 816, generating component 818, reconstructing component 820 and/or notifying component 822.

In one or more embodiments, the image preparation system 802 can comprise the computer-readable memory 804 that can be operably connected to the processor 806. The memory 804 can store computer-executable instructions that, upon execution by the processor 806, can cause the processor 806 and/or one or more other components of the image preparation system 802 (e.g., interfacing component 810, aberration component 812, backward propagating component 814, forward propagating component 816, generating component 818, reconstructing component 820 and/or notifying component 822) to perform one or more actions. In one or more embodiments, the memory 804 can store computer-executable components (e.g., interfacing component 810, aberration component 812, backward propagating component 814, forward propagating component 816, generating component 818, reconstructing component 820 and/or notifying component 822).

The image preparation system 802 and/or a component thereof as described herein, can be communicatively, electrically, operatively, optically and/or otherwise coupled to one another via a bus 805. Bus 805 can comprise one or more of a memory bus, memory controller, peripheral bus, external bus, local bus, quantum bus and/or another type of bus that can employ one or more bus architectures. One or more of these examples of bus 805 can be employed.

In one or more embodiments, the image preparation system 802 can be coupled (e.g., communicatively, electrically, operatively, optically and/or like function) to one or more external systems (e.g., a non-illustrated electrical output production system, one or more output targets and/or an output target controller), sources and/or devices (e.g., classical and/or quantum computing devices, communication devices and/or like devices), such as via a network. In one or more embodiments, one or more of the components of the image preparation system 802 and/or of the non-limiting system 600 can reside in the cloud, and/or can reside locally in a local computing environment (e.g., at a specified location).

In addition to the processor 806 and/or memory 804 described above, the image preparation system 802 can comprise one or more computer and/or machine readable, writable and/or executable components and/or instructions that, when executed by processor 806, can provide performance of one or more operations defined by such component and/or instruction.

Discussion next turns to the additional components of the image preparation system 802 (e.g., interfacing component 810, aberration component 812, backward propagating component 814, forward propagating component 816, generating component 818, reconstructing component 820 and/or notifying component 822), generally, the image preparation system 802 can perform a set of processes that can be separated into various steps comprising, but not limited to: backward propagation, forward propagation, use of a propagator 850 and/or notifying using a notification 890.

First, it is noted that in one or more embodiments, the interfacing component 810, aberration component 812, backward propagating component 814, forward propagating component 816, generating component 818, reconstructing component 820 and/or notifying component 822 can be implemented independently, without one or more other of the interfacing component 810, aberration component 812, backward propagating component 814, forward propagating component 816, generating component 818, reconstructing component 820 and/or notifying component 822. Additionally and/or alternatively, the interfacing component 810, aberration component 812, backward propagating component 814, forward propagating component 816, generating component 818, reconstructing component 820 and/or notifying component 822 can be comprised by a high-level analyzing component 803, one or more of the below-described functions of the interfacing component 810, aberration component 812, backward propagating component 814, forward propagating component 816, generating component 818, reconstructing component 820 and/or notifying component 822 can be performed by the high-level analyzing component 803, and/or the interfacing component 810, aberration component 812, backward propagating component 814, forward propagating component 816, generating component 818, reconstructing component 820 and/or notifying component 822 can be omitted with the high-level analyzing component 803 performing one or more of the below-described functions of the one or more omitted interfacing component 810, aberration component 812, backward propagating component 814, forward propagating component 816, generating component 818, reconstructing component 820 and/or notifying component 822.

Turning first to the interfacing component 810, this component can generally acquire the original signal 551. The original signal 551 can originate from and/or be caused by the energy application device 500. That is, the original signal 551 can be a result of application of an energy stream by the energy source 548 to the target 550, where the energy source can be an electron energy source generating an electron beam and/or stream. In one or more embodiments, the target 550 can be secured by the electron application device 500. As illustrated at previously-introduced FIG. 6, this signal 551 can be employed for a propagator value modification action 626 employing an aberration correction 634 output by the backward propagating component 814.

Turning next to the aberration component 812, this component can determine one or more aberration parameters, such as astigmatism parameters, such as an astigmatism angle (Phi) and an astigmatism magnitude (m) associated with the EH image 553.

For example, looking to FIG. 9, and particularly to schematic 950, astigmatism magnitude m can be defined through the ratio between the major radius 981 and the minor radius 982. See, for example, Equation 0.

$$m = 1 - \left( (\text{major radius} : \text{minor radius})/2 \right). \qquad \text{Equation 0}$$

In one or more embodiments, the aberration component 812 can obtain one or more of these parameters by use of a space search. A parameter space search can be performed by running backward propagation on an image, with adjusted parameter values, and subsequently analyzing the results thereof.

This parameter space search can be at least partially based on the example level 983, which is an intersection between the 3-dimensional (3D) function of schematic 950 (e.g., PF=Equation 2, 3 or 4 and a respective horizontal. Likewise, level curve 903 can be defined as an intersection between the 3D function of schematic 900 (e.g., $u^2+v^2$) and a respective horizontal.

Generally, the backward propagating component 814 can reduce hologram aberration of the electron hologram (EH) image 553 by modifying of a pair of sequenced parameters u and v (e.g., x and y) 830 of an array 832 upon which the EH image 553 is constructed, resulting in a modified array 842 comprising modified sequenced parameters 840.

Briefly, the modifying action can comprise direct modification of one or more of the sequenced parameters (see, e.g., Equations 1 and 2, below), addition of an aberration correction function to the sequenced parameters (see, e.g., Equations 1 and 4, below) and/or multiplication of the sequenced parameters by an aberration correction function (see, e.g., Equations 1 and 3, below).

That is, a corresponding propagator 850, and more particularly a backward propagator 850B, can be represented by and/or comprise Equation 1, wherein propagator function PF can be replaced by any one of Equation 2, Equation 3 or Equation 4. It is noted that in existing frameworks, $(u^2+v^2)$ is merely employed in the place of PF.

In these equations, u and v are sequences of consecutive integers ranging from $-N2$ to $N/2$ for a sensor with N×N (or put another way, N/2×N/2 pixels). That is, u and v each represent a set of sequenced parameters corresponding to an axis, where the pair of axes to which the pair of sequenced parameters u and v correspond can be axes that are represent and/or define the array 832 (e.g., a numerical array upon which the original image 553 is constructed, as employed by the detector 544). In one or more embodiments, the pair of corresponding axes can be axes that are orthogonal to one another, such as an x-axis and a y-axis.

In these equations, λ refers to electron wavelength of electrons emitted by the emitter 548, $z_0$ is a distance between the object 550 and the emitter 548, D is a physical size of the detector 544.

$$PropagatorBackward(u, v) = \exp\left(\iota^* \lambda^* z_0{}^* \left(1/(D^{\wedge}2)\right)^* PF\right), \quad \text{Equation 1}$$

$$\left(u^2_{corrected} + y^2_{corrected}\right), \quad \text{Equation 2}$$

$$\left(u^2 + v^2\right) * f(u, v), \text{ and} \quad \text{Equation 3}$$

$$\left(u^2 + v^2\right) + g(u, v). \quad \text{Equation 4}$$

In these equations, $u_{corrected}$ is represented as Equation 5, $v_{corrected}$ is represented as Equation 6, f(u,v) is represented as Equation 7, and g(u,v) is represented as Equation 8.

$$u_{corrected} = u^* \cos{(Phi)}^*(1 + m) + v^* \sin{(Phi)}^*(1 + m), \quad \text{Equation 5}$$

$$v_{corrected} = u^* \sin{(Phi)}/(1 + m) - v^* \cos{(Phi)}/(1 + m), \quad \text{Equation 6}$$

$$f(u, v) = \cos{((\arctan{(v, u)} - Phi)} * 2 * m + 1.0, \quad \text{Equation 7}$$

where Phi is the astigmatism angle and m is the astigmatism magnitude as determined by the aberration component 812, and $$g(u, v) = \left(u^2 + v^2\right)^* \cos((\arctan{(v, u)} - Phi)^*2)^* m, \quad \text{Equation 8}$$

where Phi is the astigmatism angle and m is the astigmatism magnitude as determined by the aberration component 812.

Optionally, the forward propagating component 816 can direct execution of a series of forward propagations in alternation with backward propagations. That is, the backward propagation, as noted above, can refer to the processes of backward propagation of the EH image from the detector to the object (e.g., as performed and/or directed by the backward propagating component 814). In one or more embodiments, a secondary forward propagation can be performed, e.g., a propagation of the EH image from the object to the detector. Further, in one or more embodiments, this sequence of backward propagation and forward propagation can further be completed one or more additional times comprises a series of N alternating backward propagations and forward propagations (e.g., backward propagation 1, forward propagation 1, backward propagation 2, forward propagation 2 . . . backward propagation N, forward propagation N). In one or more embodiments, such series instead may end at backward propagation N, thereby omitting the final forward propagation N.

That is, a corresponding propagator 850, and more particularly a forward propagator 850F, can be represented by and/or comprise Equation 9, wherein propagator function PF can be replaced by any one of Equation 2, Equation 3 or Equation 4, with additional variables and/or sub-Equations 5-7 being the same as denoted above relative to Equation 1 and the backward propagator 850B.

$$PropagatorForward(u, v) = \exp\left(-\iota^* \lambda^* z_0{}^* \left(1/(D^2)\right)^* \left(u^2 + v^2\right)\right). \quad \text{Equation 9}$$

The generating component 818 can generate the set of propagated pixels 619 and/or the propagated EH image 618 using a propagator 850 (e.g., propagator function 850) comprising the modified array 842. This modified array 842 can be a result of one or more backward propagations performed by the backward propagating component 814 and/or based on a series of one or more backward propagations alternating with one or more forward propagations as directed by the forward propagating component 816.

As a result of these components, a reduction in image and/or signal aberration can be facilitated, which reduction can be pixel-by-pixel based.

In one or more embodiments, the image preparation system can comprise a reconstructing component 820 and/or notifying component 822.

In one or more embodiments, the reconstructing component 820 generally can generate the reconstructed EH image 638, and/or reconstructed pixels 639, using a fast Fourier transform (FFT) function of a product of the propagator 850 (e.g., propagator function 850) and of an inverse fast Fourier transform (IFFT) function 616 (based on pixels 617) of a normalization of the EH image. That is, the preprocessing action 604 can include a normalizing action to scale the values of the pixels 613 of the original hologram 553, such as between values of 0 and 1, as described above.

In one or more embodiments, the notifying component 822 can generate a notification 890 corresponding to a determination that the propagated EH image 618 and/or reconstructed EH image 638 comprises a reduced level of aberrations as compared to an original level of aberrations of the original EH image 553. In one or more embodiments, this determination can be made by the generating component 818 during generating of the propagated EH image 618 and/or by the reconstructing component 820 during generating of the reconstructed EH image 638. Such determination can comprise identifying a differential quantity of contracting, expanding, stretching and/or skewing (e.g., aberration) along at least one direction (e.g., astigmatism aberration) of the original EH image 553 as compared to a contracting, expanding, stretching and/or skewing along at least one direction of the propagated EH image 618 and/or reconstructed EH image 638.

As a summary of the above-described components and functions thereof, referring next to FIG. 10, illustrated is a flow diagram of an example, non-limiting method 1000 that can facilitate a process for electron holography image aberration reduction, in accordance with one or more embodiments described herein, such as the non-limiting system 800 of FIG. 8. While the non-limiting method 1000 is described relative to the non-limiting system 800 of FIG. 8, the non-limiting method 1000 can be applicable also to other systems described herein, such as the non-limiting system 700 of FIG. 7. Repetitive description of like elements and/or processes employed in respective embodiments is omitted for sake of brevity.

At 1002, the non-limiting method 1000 can comprise modifying, by a system (e.g., backward propagating component 814) operatively coupled to a processor (e.g., processor 806), a pair of sequenced parameters (e.g., sequenced parameters u, v, 830) of an array (e.g., array 832) upon which an EH image (e.g., original image 553) is constructed, resulting in a modified array (e.g., modified array 842).

At 1004, the non-limiting method 1000 can comprise determining, by the system (e.g., backward propagating component 814), if a set of first pixel values (e.g., of pixels 619 of propagated hologram 618) resulting from the modifying action are modified relative to a set of original pixel values (e.g., of pixels 617 of IFF 616 or of pixels 613 of original hologram 553). If no, the non-limiting method 1000 can proceed back to step 1002 for re-executing the modifying action. If yes, the non-limiting method 1000 can proceed forward to step 1006.

At 1006, the non-limiting method 1000 can comprise generating, by the system (e.g., generating component 918), a propagated EH image (e.g., propagated hologram 618) using a propagator (e.g., propagator 636, 850) comprising the modified array.

As another summary of the above-described components and functions thereof, referring next to FIGS. 11 and 12, illustrated is a flow diagram of an example, non-limiting method 1100 that can facilitate a process for electron holography image aberration reduction, in accordance with one or more embodiments described herein, such as the non-limiting system 800 of FIG. 8. While the non-limiting method 1100 is described relative to the non-limiting system 800 of FIG. 8, the non-limiting method 1100 can be applicable also to other systems described herein, such as the non-limiting system 700 of FIG. 7. Repetitive description of like elements and/or processes employed in respective embodiments is omitted for sake of brevity.

At 1102, the non-limiting method 1100 can comprise determining, by a system (e.g., aberration component 812) operatively coupled to a processor (e.g., processor 906), an astigmatism angle (e.g., Phi) and an astigmatism magnitude (e.g., m) associated with an original electron holography (EH) image (e.g., original image 553).

At 1104, the non-limiting method 1100 can comprise modifying, by the system (e.g., backward propagating component 814), a pair of sequenced parameters (e.g., sequenced parameters u, v, 830) of an array (e.g., array 832) upon which the EH image is constructed, resulting in a modified array (e.g., modified array 842).

In one or more embodiments, the pair of sequenced parameters comprise sequences of consecutive integers having ranges from –N/2 to N/2, which ranges correspond to a sensor having –N/2 by N/2 pixels, the sensor having been employed to generate the EH image.

At 1106, step 1104 can comprise modifying, by the system (e.g., backward propagating component 814), the pair of sequenced parameters using the astigmatism angle and the astigmatism magnitude.

At 1108, step 1104 can comprise generating, by the system (e.g., backward propagating component 814), a propagator (e.g., propagator 850) being a function of a summation of squares of a modified pair of sequenced parameters resulting from the modifying.

At 1110, step 1104 can comprise generating, by the system (e.g., backward propagating component 814), the propagator being a function of an exponential of a distance between an object (e.g., object 550) and an emitter (e.g., emitter 548) having been employed to generate the EH image of the object, a physical size of a detector (e.g., detector 544) having been employed to receive electrons (e.g., of electron path 549) from the emitter, and a wavelength of the electrons.

At 1112, step 1104 can comprise generating, by the system (e.g., backward propagating component 814), the propagator being a function of a summation of squares, of an initial pair of sequenced parameters, with the summation of the squares multiplied by an aberration correction function comprising an astigmatism adjustment using a determined angle and magnitude of the astigmatism.

At 1114, step 1104 can comprise generating, by the system (e.g., backward propagating component 814), the propagator being a function of a summation of squares, of an initial pair of sequenced parameters, with the summation of the squares summed with an aberration correction function comprising an astigmatism adjustment using a determined angle and magnitude of the astigmatism.

At optional 1116, the non-limiting method 1100 can comprise an optional step of optionally directing, by the system (e.g., forward propagating component 816), execution of a series of forward propagations in alternation with backward propagations, wherein use of the propagator by the propagator component to reduce hologram aberration of the electron hologram (EH) image provides for a backward propagation of the backward propagations, and wherein a forward propagation of the forward propagations also comprises use of the modified array.

At 1118, the non-limiting method 1100 can comprise generating, by the system, a propagated EH image using a propagator comprising the modified array.

At 1120, the non-limiting method 1100 can comprise determining, by the system (e.g., backward propagating component 814), if a set of first pixel values resulting from the modifying action are modified relative to the set of original pixel values. If not, the non-limiting method 1100 can proceed back to step 1104 for re-executing the modifying action. If yes, the non-limiting method 1000 can proceed forward to step 1120.

At 1122, the non-limiting method 1100 can comprise generating, by the system (e.g., notifying component 822), a notification (e.g., notification 890) corresponding to a determination that the reconstructed EH image comprises a reduced level of aberrations as compared to an original level of aberrations of the EH image.

ADDITIONAL SUMMARY

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture for transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, computer program products and/or computer-implemented methods provided herein relate to a process for electron holography image aberration reduction. A system can comprise a memory that stores, and a processor that executes, computer executable components. The computer executable components can comprise a propagating component that reduces hologram aberration of an electron hologram (EH) image by modifying of a pair of sequenced parameters of an array upon which the EH image is constructed, resulting in a modified array, and a generating component that generates a propagated EH image using a propagator comprising the modified array.

The one or more embodiments disclosed herein can achieve improved performance relative to existing approaches. For example, based at least on application of a propagator function to a pair of sequenced parameters of an array upon which the EH is constructed, aberration of the resultant propagated EH image and/or reconstructed EH image can be reduced. That is during the existing processes of backward propagation of the EH image from the detector to the object, aberration causing inaccurate acquisition of pixel data along one reference direction (e.g., a u or x direction) versus along a second reference direction (e.g., a v or y direction) can be adjusted by the use of the propagator function (also herein referred to as a propagator). In this way, a general blurring, contracting, expanding and/or skewing of a resultant propagated EH image and/or reconstructed EH image (e.g., reconstructed subsequent to employment of the propagator) along one or more directions can be reduced, allowing for a more accurate reconstructed image to be generated. Accordingly, preparation of an electron holography (EH) signal upon which a reconstructed image is based can be made more accurate as compared to existing approaches that fail to recognize effects of such aberration.

The one or more embodiments described herein can be implemented within, in connection with and/or coupled to an electron holography (EH) imaging device, such as the imaging system 500 generically illustrated at FIG. 5.

Indeed, in view of the one or more embodiments described herein, a practical application of the one or more systems, computer-implemented methods and/or computer program products described herein can be ability to provide aberration reduction of a reconstructed image that has been reconstructed using an EH imaging device during processes that prepare the corresponding EH signal upon which the reconstructed image is based. That is, as compared to existing frameworks that cannot provide this ability, the one or more embodiments described herein can provide a new result (e.g., the values 637 of a corrected propagator 636 and/or the aberration-adjusted pixels 639 of the reconstructed image 638) that was previously unavailable.

These are useful and practical applications of computers, thus providing enhanced (e.g., improved and/or optimized) material analysis and pixel value data output. Overall, such computerized tools can constitute a concrete and tangible technical improvement in the fields of material analysis, and more particularly in material analysis using electron hologram techniques.

Furthermore, one or more embodiments described herein can be employed in a real-world system based on the disclosed teachings. For example, as noted above, in cases of hardware/software, acquisition interference, and/or the like, the one or more embodiments described herein can perform a successful pixel value preparation (e.g., at least corresponding to aberration reduction) in advance of a reconstruction of a hologram, with the reconstruction resultingly having reduced expansion, contraction, stretching and/or skewing in at least one direction along the hologram, relative to one or more other directions along the hologram, as compared to existing techniques. The embodiments disclosed herein thus can provide improvements to scientific instrument technology (e.g., improvements in the computer technology supporting such scientific instruments, among other improvements).

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to material analysis using holograms, as compared to existing systems and/or techniques using holograms. Systems, computer-implemented methods and/or computer program products providing performance of these processes are of great utility in the fields of material analysis, such as comprising use of electron energy holograms and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively analyze an electron energy hologram and associated digital pixel data as the one or more embodiments described herein can provide this process. Moreover, neither can the human mind nor a human with pen and paper conduct one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

To provide additional summary, a listing of embodiments and features thereof is next provided.

A system, comprising: a memory that stores computer executable components; and a processor that executes the computer executable components stored in the memory, wherein the computer executable components comprise: a propagating component that reduces hologram aberration of an electron hologram (EH) image by modifying of a pair of sequenced parameters of an array upon which the EH image is constructed, resulting in a modified array; and a generating component that generates a propagated EH image using a propagator comprising the modified array.

The system of any preceding paragraph, wherein the pair of sequenced parameters comprise sequences of consecutive integers having ranges from $-N/2$ to $N/2$, which ranges correspond to a sensor having $-N/2$ by $N/2$ pixels, the sensor having been employed to generate the EH image.

The system of any preceding paragraph, wherein the computer executable components further comprise: an aberration component that determines an astigmatism angle and an astigmatism magnitude associated with the EH image, wherein the propagating component modifies the pair of sequenced parameters using the astigmatism angle and the astigmatism magnitude.

The system of any preceding paragraph, wherein the propagator is a function of a summation of squares of a modified pair of sequenced parameters resulting from the modifying.

The system of any preceding paragraph, wherein the propagator is a function of an exponential of a distance between an object and an emitter having been employed to generate the EH image of the object, a physical size of a detector having been employed to receive electrons from the emitter, and a wavelength of the electrons.

The system of any preceding paragraph, wherein the computer executable components further comprise: a reconstruction component that generates a reconstructed EH image, based on the propagated EH image using a fast Fourier transform (FFT) function of a product of the propagator and of an inverse fast Fourier transform (IFFT) function of a normalization of the EH image.

system of any preceding paragraph, wherein the computer executable components further comprise: an aberration component that determines an astigmatism angle and an astigmatism magnitude associated with the EH image, wherein the propagator is a function of a summation of squares, of an initial pair of sequenced parameters, with the summation of the squares multiplied by an aberration correction function comprising an astigmatism adjustment using the astigmatism angle and astigmatism magnitude.

The system of any preceding paragraph, wherein the computer executable components further comprise: an aberration component that determines an astigmatism angle and an astigmatism magnitude associated with the EH image, wherein the propagator is a function of a summation of squares, of an initial pair of sequenced parameters, with the summation of the squares summed with an aberration correction function comprising an astigmatism adjustment using the astigmatism angle and astigmatism magnitude.

The system of any preceding paragraph, further comprising: a forward propagation component that directs execution of a series of forward propagations in alternation with backward propagations, wherein use of the propagator by the propagating component to reduce hologram aberration of the electron hologram (EH) image provides for a backward propagation of the backward propagations, and wherein a forward propagation of the forward propagations also comprises use of the modified array.

The system of any preceding paragraph, wherein the computer executable components further comprise: a notifying component that generates a notification corresponding to a determination that the propagated EH image comprises a reduced level of aberrations as compared to an original level of aberrations of the EH image.

A computer-implemented method, comprising: reducing, by a system operatively coupled to a processor, hologram aberration at an electron hologram (EH) image by modifying, by the system, a pair of sequenced parameters of a array upon which the EH image is constructed, resulting in a modified array; and generating, by the system, a propagated EH image using a propagator comprising the modified array.

The computer-implemented method of the preceding paragraph, wherein the pair of sequenced parameters comprise sequences of consecutive integers having ranges from $-N/2$ to $N/2$, which ranges correspond to a sensor having $-N/2$ by $N/2$ pixels, the sensor having been employed to generate the EH image.

The computer-implemented method of any preceding paragraph, further comprising: determining, by the system, an astigmatism angle and an astigmatism magnitude associated with the EH; and modifying, by the system, the pair of sequenced parameters using the astigmatism angle and the astigmatism magnitude.

The computer-implemented method of any preceding paragraph, wherein the propagator is a function of a summation of squares of a modified pair of sequenced parameters resulting from the modifying.

The computer-implemented method of any preceding paragraph, wherein the propagator is a function of an exponential of a distance between an object and an emitter having been employed to generate the EH image of the object, a physical size of a detector having been employed to receive electrons from the emitter, and a wavelength of the electrons.

A computer program product facilitating a process for electron hologram aberration reduction, the computer program product comprising a computer readable storage medium having program instructions embodied therewith, and the program instructions executable by a processor to cause the processor to: reduce, by the processor, hologram aberration at an electron hologram (EH) image by modifying, by the processor, a pair of sequenced parameters of a array upon which the EH image is constructed, resulting in a modified array; and generate, by the processor, a propagated EH image using a propagator comprising the modified array.

The computer program product of the preceding paragraph, wherein the pair of sequenced parameters comprise sequences of consecutive integers having ranges from –N/2 to N/2, which ranges correspond to a sensor having –N/2 by N/2 pixels, the sensor having been employed to generate the EH image.

The computer program product of any preceding paragraph, wherein the program instructions are further executable by the processor to cause the processor to: determine, by the processor, an astigmatism angle and an astigmatism magnitude associated with the EH; and modify, by the processor, the pair of sequenced parameters using the astigmatism angle and the astigmatism magnitude.

The computer program product of any preceding paragraph, wherein the propagator is a function of a summation of squares of a modified pair of sequenced parameters resulting from the modifying.

The computer program product of any preceding paragraph, wherein the propagator is a function of an exponential of a distance between an object and an emitter having been employed to generate the EH image of the object, a physical size of a detector having been employed to receive electrons from the emitter, and a wavelength of the electrons.

Scientific Instrument System Description

Turning next to FIG. 13, a detailed description is provided of additional context for the one or more embodiments described herein at FIGS. 1-12. One or more computing devices implementing any of the scientific instrument modules or methods disclosed herein can be part of a scientific instrument system. FIG. 13 illustrates a block diagram of an example scientific instrument system 1300 in which one or more of the scientific instrument methods or other methods disclosed herein can be performed, in accordance with various embodiments described herein. The scientific instrument modules and methods disclosed herein (e.g., the scientific instrument module 100 of FIG. 1 and the method 200 of FIG. 2) can be implemented by one or more of the scientific instrument 1310, the user local computing device 1320, the service local computing device 1330, and/or the remote computing device 1340 of the scientific instrument system 1300.

Any of the scientific instrument 1310, the user local computing device 1320, the service local computing device 1330, and/or the remote computing device 1340 can include any of the embodiments of the computing device 400 discussed herein with reference to FIG. 4, and any of the scientific instrument 1310, the user local computing device 1320, the service local computing device 1330, and/or the remote computing device 1340 can take the form of any appropriate one or more of the embodiments of the computing device 400 discussed herein with reference to FIG. 4.

One or more of the scientific instrument 1310, the user local computing device 1320, the service local computing device 1330, and/or the remote computing device 1340 can include a processing device 1302, a storage device 1304, and/or an interface device 1306. The processing device 1302 can take any suitable form, including the form of any of the processors 402 discussed herein with reference to FIG. 4. The processing devices 1302 included in different ones of the scientific instrument 1310, the user local computing device 1320, the service local computing device 1330, and/or the remote computing device 1340 can take the same form or different forms. The storage device 1304 can take any suitable form, including the form of any of the storage devices 404 discussed herein with reference to FIG. 4. The storage devices 1304 included in different ones of the scientific instrument 1310, the user local computing device 1320, the service local computing device 1330, and/or the remote computing device 1340 can take the same form or different forms. The interface device 1306 can take any suitable form, including the form of any of the interface devices 406 discussed herein with reference to FIG. 4. The interface devices 1306 included in different ones of the scientific instrument 1310, the user local computing device 1320, the service local computing device 1330, and/or the remote computing device 1340 can take the same form or different forms.

The scientific instrument 1310, the user local computing device 1320, the service local computing device 1330, and/or the remote computing device 1340 can be in communication with other elements of the scientific instrument system 1300 via communication pathways 1308. The communication pathways 1308 can communicatively couple the interface devices 1306 of different ones of the elements of the scientific instrument system 1300, as shown, and can be wired or wireless communication pathways (e.g., in accordance with any of the communication techniques discussed herein with reference to the interface devices 406 of the computing device 400 of FIG. 4). The particular scientific instrument system 1300 depicted in FIG. 13 includes communication pathways between each pair of the scientific instrument 1310, the user local computing device 1320, the service local computing device 1330, and the remote computing device 1340, but this "fully connected" implementation is simply illustrative, and in various embodiments, various ones of the communication pathways 1308 can be omitted. For example, in one or more embodiments, a service local computing device 1330 can omit a direct communication pathway 1308 between its interface device 1306 and the interface device 1306 of the scientific instrument 1310, but can instead communicate with the scientific instrument 1310 via the communication pathway 1308 between the service local computing device 1330 and the user local computing device 1320 and/or the communication pathway 1308 between the user local computing device 1320 and the scientific instrument 1310.

The scientific instrument 1310 can include any appropriate scientific instrument, such as a separation or MS instrument, or other instrument facilitating material analysis.

The user local computing device 1320 can be a computing device (e.g., in accordance with any of the embodiments of the computing device 400 discussed herein) that is local to a user of the scientific instrument 1310. In one or more embodiments, the user local computing device 1320 can also be local to the scientific instrument 1310, but this need not be the case; for example, a user local computing device 1320 that is associated with a home, office or other building associated with a user entity can be remote from, but in communication with, the scientific instrument 1310 so that the user entity can use the user local computing device 1320 to control and/or access data from the scientific instrument 1310. In one or more embodiments, the user local computing device 1320 can be a laptop, smartphone, or tablet device. In one or more embodiments the user local computing device 1320 can be a portable computing device. In one or more embodiments, the user local computing device 1320 can deployed in the field.

The service local computing device 1330 can be a computing device (e.g., in accordance with any of the embodiments of the computing device 400 discussed herein) that is local to an entity that services the scientific instrument 1310. For example, the service local computing device 1330 can be local to a manufacturer of the scientific instrument 1310 or to a third-party service company. In one or more embodiments, the service local computing device 1330 can communicate with the scientific instrument 1310, the user local computing device 1320, and/or the remote computing device 1340 (e.g., via a direct communication pathway 1308 or via multiple "indirect" communication pathways 1308, as discussed above) to receive data regarding the operation of the scientific instrument 1310, the user local computing device 1320, and/or the remote computing device 1340 (e.g., the results of self-tests of the scientific instrument 1310, calibration coefficients used by the scientific instrument 1310, the measurements of sensors associated with the scientific instrument 1310, etc.). In one or more embodiments, the service local computing device 1330 can communicate with the scientific instrument 1310, the user local computing device 1320, and/or the remote computing device 1340 (e.g., via a direct communication pathway 1308 or via multiple "indirect" communication pathways 1308, as discussed above) to transmit data to the scientific instrument 1310, the user local computing device 1320, and/or the remote computing device 1340 (e.g., to update programmed instructions, such as firmware, in the scientific instrument 1310, to initiate the performance of test or calibration sequences in the scientific instrument 1310, to update programmed instructions, such as software, in the user local computing device 1320 or the remote computing device 1340, etc.). A user entity of the scientific instrument 1310 can utilize the scientific instrument 1310 or the user local computing device 1320 to communicate with the service local computing device 1330 to report a problem with the scientific instrument 1310 or the user local computing device 1320, to request a visit from a technician to improve the operation of the scientific instrument 1310, to order consumables or replacement parts associated with the scientific instrument 1310, or for other purposes.

The remote computing device 1340 can be a computing device (e.g., in accordance with any of the embodiments of the computing device 400 discussed herein) that is remote from the scientific instrument 1310 and/or from the user local computing device 1320. In one or more embodiments, the remote computing device 1340 can be included in a datacenter or other large-scale server environment. In one or more embodiments, the remote computing device 1340 can include network-attached storage (e.g., as part of the storage device 1304). The remote computing device 1340 can store data generated by the scientific instrument 1310, perform analyses of the data generated by the scientific instrument 1310 (e.g., in accordance with programmed instructions), facilitate communication between the user local computing device 1320 and the scientific instrument 1310, and/or facilitate communication between the service local computing device 1330 and the scientific instrument 1310.

In one or more embodiments, one or more of the elements of the scientific instrument system 1300 illustrated in FIG. 13 can be omitted. Further, in one or more embodiments, multiple ones of various ones of the elements of the scientific instrument system 1300 of FIG. 13 can be present. For example, a scientific instrument system 1300 can include multiple user local computing devices 1320 (e.g., different user local computing devices 1320 associated with different user entities or in different locations). In another example, a scientific instrument system 1300 can include multiple scientific instruments 1310, all in communication with service local computing device 1330 and/or a remote computing device 1340; in such an embodiment, the service local computing device 1330 can monitor these multiple scientific instruments 1310, and the service local computing device 1330 can cause updates or other information can be "broadcast" to multiple scientific instruments 1310 at the same time. Different ones of the scientific instruments 1310 in a scientific instrument system 1300 can be located close to one another (e.g., in the same room) or farther from one another (e.g., on different floors of a building, in different buildings, in different cities, etc.). In one or more embodiments, a scientific instrument 1310 can be connected to an Internet-of-Things (IoT) stack that allows for command and control of the scientific instrument 1310 through a web-based application, a virtual or augmented reality application, a mobile application, and/or a desktop application. Any of these applications can be accessed by a user entity operating the user local computing device 1320 in communication with the scientific instrument 1310 by the intervening remote computing device 1340. In one or more embodiments, a scientific instrument 1310 can be sold by the manufacturer along with one or more associated user local computing devices 1320 as part of a local scientific instrument computing unit 1312.

In one or more embodiments, different ones of the scientific instruments 1310 included in a scientific instrument system 1300 can be different types of scientific instruments 1310; for example, one scientific instrument 1310 can be an EDS device, while another scientific instrument 1310 can be an analysis device that analyzes results of an EDS device. In some such embodiments, the remote computing device 1340 and/or the user local computing device 1320 can combine data from different types of scientific instruments 1310 included in a scientific instrument system 1300.

Example Operating Environment

Figure 14:
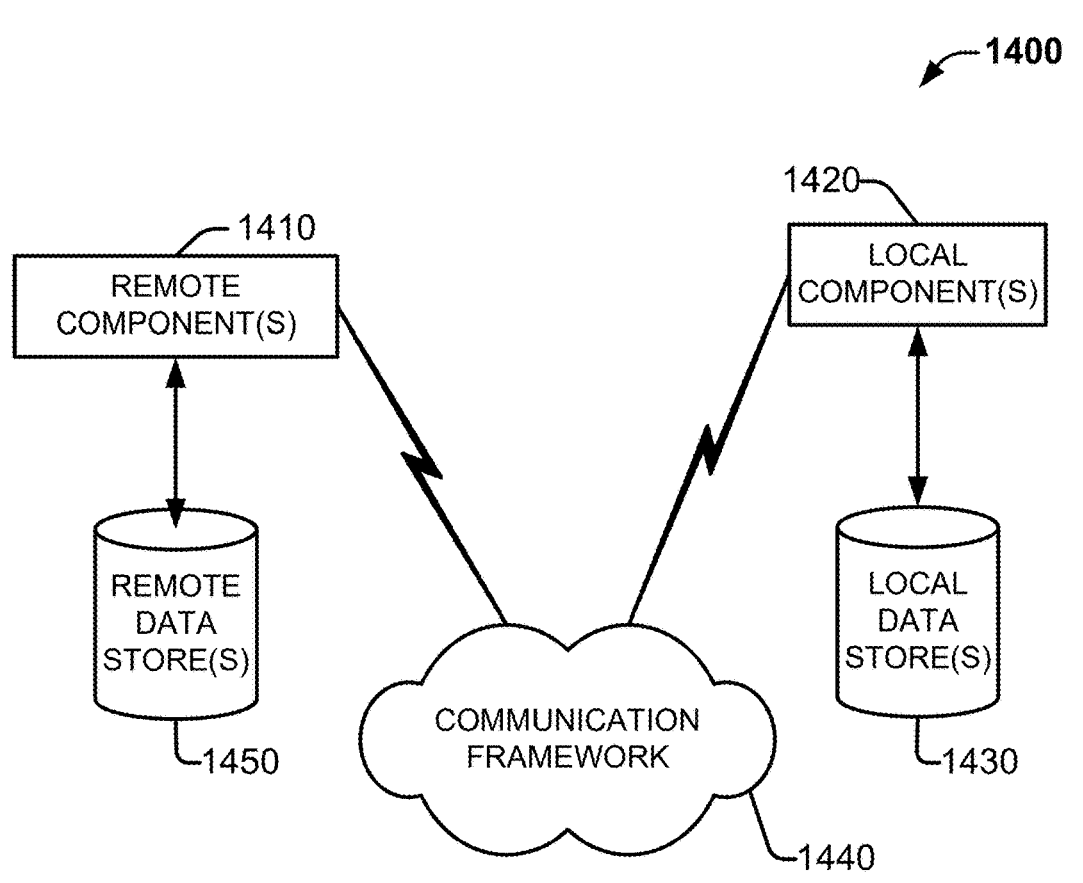
FIG. 14 illustrates a block diagram of an example operating environment into which embodiments of the subject matter described herein can be incorporated.

FIG. 14 is a schematic block diagram of an operating environment 1400 with which the described subject matter can interact. The operating environment 1400 comprises one or more remote component(s) 1410. The remote component(s) 1410 can be hardware and/or software (e.g., threads, processes, computing devices). In one or more embodiments, remote component(s) 1410 can be a distributed computer system, connected to a local automatic scaling component and/or programs that use the resources of a distributed computer system, via communication framework 1440. Communication framework 1440 can comprise wired network devices, wireless network devices, mobile devices, wearable devices, radio access network devices, gateway devices, femtocell devices, servers, etc.

The operating environment 1400 also comprises one or more local component(s) 1420. The local component(s) 1420 can be hardware and/or software (e.g., threads, processes, computing devices). In one or more embodiments, local component(s) 1420 can comprise an automatic scaling component and/or programs that communicate/use the remote resources 1410 and 1420, etc., connected to a remotely located distributed computing system via communication framework 1440.

One possible communication between a remote component(s) 1410 and a local component(s) 1420 can be in the form of a data packet adapted to be transmitted between two or more computer processes. Another possible communication between a remote component(s) 1410 and a local component(s) 1420 can be in the form of circuit-switched data adapted to be transmitted between two or more computer processes in radio time slots. The operating environment 1400 comprises a communication framework 1440 that can be employed to facilitate communications between the remote component(s) 1410 and the local component(s) 1420, and can comprise an air interface, e.g., interface of a UMTS network, via an LTE network, etc. Remote component(s) 1410 can be operably connected to one or more remote data store(s) 1450, such as a hard drive, solid state drive, subscriber identity module (SIM) card, electronic SIM (eSIM), device memory, etc., that can be employed to store information on the remote component(s) 1410 side of communication framework 1440. Similarly, local component(s) 1420 can be operably connected to one or more local data store(s) 1430, that can be employed to store information on the local component(s) 1420 side of communication framework 1440.

Example Computing Environment

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform tasks or implement abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 15, the example computing environment 1500 which can implement one or more embodiments described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), and can include one or more external storage devices 1516 (e.g., a magnetic floppy disk drive (FDD) 1516, a memory stick or flash drive reader, a memory card reader, etc.). While the internal HDD 1514 is illustrated as located within the computer 1502, the internal HDD 1514 can also be configured for external use in a suitable chassis (not shown). Additionally, while not shown in computing environment 1500, a solid-state drive (SSD) could be used in addition to, or in place of, an HDD 1514.

Other internal or external storage can include at least one other storage device 1520 with storage media 1522 (e.g., a solid-state storage device, a nonvolatile memory device, and/or an optical disk drive that can read or write from removable media such as a CD-ROM disc, a DVD, a BD, etc.). The external storage 1516 can be facilitated by a network virtual machine. The HDD 1514, external storage device 1516 and storage device (e.g., drive) 1520 can be connected to the system bus 1508 by an HDD interface 1524, an external storage interface 1526 and a drive interface 1528, respectively.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user entity can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera, a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can also be connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer 1550. The remote computer 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. The network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, commu-
nications satellite, any piece of equipment or location asso-
ciated with a wirelessly detectable tag (e.g., a kiosk, news
stand, store shelf, etc.), and telephone. This can include
Wireless Fidelity (Wi-Fi) and BLUETOOTH® wireless
technologies. Thus, the communication can be a defined
structure as with an existing network or simply an ad hoc
communication between at least two devices.

ADDITIONAL INFORMATION

The embodiments described herein can be directed to one
or more of a system, a method, an apparatus and/or a
computer program product at any possible technical detail
level of integration. The computer program product can
include a computer readable storage medium (or media)
having computer readable program instructions thereon for
causing a processor to carry out aspects of the one or more
embodiments described herein. The computer readable stor-
age medium can be a tangible device that can retain and
store instructions for use by an instruction execution device.
The computer readable storage medium can be, for example,
but is not limited to, an electronic storage device, a magnetic
storage device, an optical storage device, an electromagnetic
storage device, a superconducting storage device and/or any
suitable combination of the foregoing. A non-exhaustive list
of more specific examples of the computer readable storage
medium can also include the following: a portable computer
diskette, a hard disk, a random access memory (RAM), a
read-only memory (ROM), an erasable programmable read-
only memory (EPROM or Flash memory), a static random
access memory (SRAM), a portable compact disc read-only
memory (CD-ROM), a digital versatile disk (DVD), a
memory stick, a floppy disk, a mechanically encoded device
such as punch-cards or raised structures in a groove having
instructions recorded thereon and/or any suitable combina-
tion of the foregoing. A computer readable storage medium,
as used herein, is not to be construed as being transitory
signals per se, such as radio waves and/or other freely
propagating electromagnetic waves, electromagnetic waves
propagating through a waveguide and/or other transmission
media (e.g., light pulses passing through a fiber-optic cable),
and/or electrical signals transmitted through a wire.

Computer readable program instructions described herein
can be downloaded to respective computing/processing
devices from a computer readable storage medium and/or to
an external computer or external storage device via a net-
work, for example, the Internet, a local area network, a wide
area network and/or a wireless network. The network can
comprise copper transmission cables, optical transmission
fibers, wireless transmission, routers, firewalls, switches,
gateway computers and/or edge servers. A network adapter
card or network interface in each computing/processing
device receives computer readable program instructions
from the network and forwards the computer readable
program instructions for storage in a computer readable
storage medium within the respective computing/processing
device. Computer readable program instructions for carrying
out operations of the one or more embodiments described
herein can be assembler instructions, instruction-set-archi-
tecture (ISA) instructions, machine instructions, machine
dependent instructions, microcode, firmware instructions,
state-setting data, configuration data for integrated circuitry,
and/or source code and/or object code written in any com-
bination of one or more programming languages, including
an object oriented programming language such as Smalltalk,
C++ or the like, and/or procedural programming languages, such as the "C" programming language and/or similar
programming languages. The computer readable program
instructions can execute entirely on a computer, partly on a
computer, as a stand-alone software package, partly on a
computer and/or partly on a remote computer or entirely on
the remote computer and/or server. In the latter scenario, the
remote computer can be connected to a computer through
any type of network, including a local area network (LAN)
and/or a wide area network (WAN), and/or the connection
can be made to an external computer (for example, through
the Internet using an Internet Service Provider). In one or
more embodiments, electronic circuitry including, for
example, programmable logic circuitry, field-programmable
gate arrays (FPGA) and/or programmable logic arrays
(PLA) can execute the computer readable program instruc-
tions by utilizing state information of the computer readable
program instructions to personalize the electronic circuitry,
in order to perform aspects of the one or more embodiments
described herein.

Aspects of the one or more embodiments described herein
are described with reference to flowchart illustrations and/or
block diagrams of methods, apparatus (systems), and com-
puter program products according to one or more embodi-
ments described herein. It will be understood that each block
of the flowchart illustrations and/or block diagrams, and
combinations of blocks in the flowchart illustrations and/or
block diagrams, can be implemented by computer readable
program instructions. These computer readable program
instructions can be provided to a processor of a general-
purpose computer, special purpose computer and/or other
programmable data processing apparatus to produce a
machine, such that the instructions, which execute via the
processor of the computer or other programmable data
processing apparatus, can create means for implementing
the functions/acts specified in the flowchart and/or block
diagram block or blocks. These computer readable program
instructions can also be stored in a computer readable
storage medium that can direct a computer, a programmable
data processing apparatus and/or other devices to function in
a particular manner, such that the computer readable storage
medium having instructions stored therein can comprise an
article of manufacture including instructions which can
implement aspects of the function/act specified in the flow-
chart and/or block diagram block or blocks. The computer
readable program instructions can also be loaded onto a
computer, other programmable data processing apparatus
and/or other device to cause a series of operational acts to be
performed on the computer, other programmable apparatus
and/or other device to produce a computer implemented
process, such that the instructions which execute on the
computer, other programmable apparatus and/or other
device implement the functions/acts specified in the flow-
chart and/or block diagram block or blocks.

The flowcharts and block diagrams in the figures illustrate
the architecture, functionality and/or operation of possible
implementations of systems, computer-implementable
methods and/or computer program products according to
one or more embodiments described herein. In this regard,
each block in the flowchart or block diagrams can represent
a module, segment and/or portion of instructions, which
comprises one or more executable instructions for imple-
menting the specified logical function. In one or more
alternative implementations, the functions noted in the
blocks can occur out of the order noted in the Figures. For
example, two blocks shown in succession can be executed
substantially concurrently, and/or the blocks can sometimes
be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments can use the phrases "an embodiment," "various embodiments," "one or more embodiments" and/or "some embodiments," each of which can refer to one or more of the same or different embodiments.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
a memory that stores computer executable components; and
a processor that executes the computer executable components stored in the memory, wherein the computer executable components comprise:
  a propagating component that reduces hologram aberration of an electron hologram (EH) image by modifying of a pair of sequenced parameters of an array upon which the EH image is constructed, resulting in a modified array; and
  a generating component that generates a propagated EH image using a propagator comprising the modified array,
  wherein the propagator is a function of an exponential of a distance between an object and an emitter having been employed to generate the EH image of the object, a physical size of a detector having been employed to receive electrons from the emitter, and a wavelength of the electrons.

2. The system of claim 1, wherein the pair of sequenced parameters comprise sequences of consecutive integers having ranges from $-N/2$ to $N/2$, which ranges correspond to a sensor having $-N/2$ by $N/2$ pixels, the sensor having been employed to generate the EH image.

3. The system of claim 1, wherein the computer executable components further comprise:
an aberration component that determines an astigmatism angle and an astigmatism magnitude associated with the EH image,
wherein the propagating component modifies the pair of sequenced parameters using the astigmatism angle and the astigmatism magnitude.

4. The system of claim 1, wherein the propagator further is a function of a summation of squares of a modified pair of sequenced parameters resulting from the modifying.

5. The system of claim 1, wherein the computer executable components further comprise:
a reconstruction component that generates a reconstructed EH image, based on the propagated EH image, using a fast Fourier transform (FFT) function of a product of the propagator and of an inverse fast Fourier transform (IFFT) function of a normalization of the EH image.

6. The system of claim 1, wherein the computer executable components further comprise:
an aberration component that determines an astigmatism angle and an astigmatism magnitude associated with the EH image,
wherein the propagator further is a function of a summation of squares, of an initial pair of sequenced parameters, with the summation of the squares multiplied by an aberration correction function comprising an astigmatism adjustment using the astigmatism angle and the astigmatism magnitude.

7. The system of claim 1, wherein the computer executable components further comprise:
an aberration component that determines an astigmatism angle and an astigmatism magnitude associated with the EH image,
wherein the propagator further is a function of a summation of squares, of an initial pair of sequenced parameters, with the summation of the squares summed with an aberration correction function comprising an astigmatism adjustment using the astigmatism angle and the astigmatism magnitude.

8. The system of claim 1, further comprising:
a forward propagation component that directs execution of a series of forward propagations in alternation with backward propagations,
wherein use of the propagator by the propagating component to reduce the hologram aberration of the EH image provides for a backward propagation of the backward propagations, and
wherein a forward propagation of the series of forward propagations also comprises use of the modified array.

9. The system of claim 1, wherein the computer executable components further comprise:
a notifying component that generates a notification corresponding to a determination that the propagated EH image comprises a reduced level of aberrations as compared to an original level of aberrations of the EH image.

10. A computer-implemented method, comprising:
reducing, by a system operatively coupled to a processor, hologram aberration at an electron hologram (EH) image by modifying, by the system, a pair of sequenced parameters of an array upon which the EH image is constructed, resulting in a modified array; and
generating, by the system, a propagated EH image using a propagator comprising the modified array,
wherein the propagator is a function of an exponential of a distance between an object and an emitter having been employed to generate the EH image of the object, a physical size of a detector having been employed to receive electrons from the emitter, and a wavelength of the electrons.

11. The computer-implemented method of claim 10, wherein the pair of sequenced parameters comprise sequences of consecutive integers having ranges from $-N/2$ to N/2, which ranges correspond to a sensor having –N/2 by N/2 pixels, the sensor having been employed to generate the EH image.

12. The computer-implemented method of claim 10, further comprising:

determining, by the system, an astigmatism angle and an astigmatism magnitude associated with the EH image; and modifying, by the system, the pair of sequenced parameters using the astigmatism angle and the astigmatism magnitude.

13. The computer-implemented method of claim 10, wherein the propagator further is a function of a summation of squares of a modified pair of sequenced parameters resulting from the modifying.

14. The computer-implemented method of claim 10, further comprising:

determining, by the system, an astigmatism angle and an astigmatism magnitude associated with the EH image, wherein the propagator further is a function of a summation of squares, of an initial pair of sequenced parameters, with the summation of the squares multiplied by an aberration correction function comprising an astigmatism adjustment using the astigmatism angle and the astigmatism magnitude.

15. The computer-implemented method of claim 10, further comprising:

determining, by the system, an astigmatism angle and an astigmatism magnitude associated with the EH image, wherein the propagator further is a function of a summation of squares, of an initial pair of sequenced parameters, with the summation of the squares summed with an aberration correction function comprising an astigmatism adjustment using the astigmatism angle and the astigmatism magnitude.

16. The computer-implemented method of claim 10, further comprising directing, by the system, execution of a series of forward propagations in alternation with backward propagations, wherein use of the propagator to reduce the hologram aberration of the EH image provides for a backward propagation of the backward propagations, and wherein a forward propagation of the series of forward propagations also comprises use of the modified array.

17. A computer program product facilitating a process for electron hologram aberration reduction, the computer program product comprising a computer readable storage medium having program instructions embodied therewith, and the program instructions executable by a processor to cause the processor to:

reduce, by the processor, the hologram aberration at an electron hologram (EH) image by modifying, by the processor, a pair of sequenced parameters of an array upon which the EH image is constructed, resulting in a modified array; and generate, by the processor, a propagated EH image using a propagator comprising the modified array, wherein the propagator is a function of an exponential of a distance between an object and an emitter having been employed to generate the EH image of the object, a physical size of a detector having been employed to receive electrons from the emitter, and a wavelength of the electrons.

18. The computer program product of claim 17, wherein the pair of sequenced parameters comprise sequences of consecutive integers having ranges from –N/2 to N/2, which ranges correspond to a sensor having –N/2 by N/2 pixels, the sensor having been employed to generate the EH image.

19. The computer program product of claim 17, wherein the program instructions are further executable by the processor to cause the processor to:

determine, by the processor, an astigmatism angle and an astigmatism magnitude associated with the EH image; and modify, by the processor, the pair of sequenced parameters using the astigmatism angle and the astigmatism magnitude.

20. The computer program product of claim 17, wherein the propagator further is a function of a summation of squares of a modified pair of sequenced parameters resulting from the modifying.

\* \* \* \* \*